(12) United States Patent
Kai

(10) Patent No.: US 11,120,416 B2
(45) Date of Patent: Sep. 14, 2021

(54) VENDING MACHINE MANAGEMENT SYSTEM, VENDING MACHINE MANAGEMENT METHOD, MANAGEMENT DEVICE, PORTABLE TERMINAL, AND PROGRAM

(71) Applicant: RAKUTEN GROUP, INC., Tokyo (JP)

(72) Inventor: Kikumi Kai, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 155 days.

(21) Appl. No.: 16/329,223

(22) PCT Filed: Sep. 5, 2016

(86) PCT No.: PCT/JP2016/076032
§ 371 (c)(1),
(2) Date: Jul. 3, 2019

(87) PCT Pub. No.: WO2018/042669
PCT Pub. Date: Mar. 8, 2018

(65) Prior Publication Data
US 2019/0325411 A1   Oct. 24, 2019

(51) Int. Cl.
*G06Q 20/18* (2012.01)
*G06Q 20/20* (2012.01)
(Continued)

(52) U.S. Cl.
CPC .......... *G06Q 20/18* (2013.01); *G06Q 20/202* (2013.01); *G06Q 20/322* (2013.01); *G06Q 20/4014* (2013.01)

(58) Field of Classification Search
CPC .... G06Q 20/18; G06Q 20/202; G06Q 20/322; G06Q 20/4014; G06Q 20/3276;
(Continued)

(56) References Cited

U.S. PATENT DOCUMENTS

2002/0161476 A1* 10/2002 Panofsky ................ G07F 17/16
700/231
2005/0102233 A1   5/2005 Park et al.
(Continued)

FOREIGN PATENT DOCUMENTS

JP    2002-063631 A    2/2002
JP    2003-085464 A    3/2003
(Continued)

OTHER PUBLICATIONS

The Office Action dated Mar. 26, 2019, for corresponding JP application No. 2018-536674 and a partial translation of the Office Action.
(Continued)

*Primary Examiner* — Garcia Ade
(74) *Attorney, Agent, or Firm* — HEA Law PLLC

(57) ABSTRACT

A mobile terminal (10) includes an identification information acquisition unit (101) configured to acquire identification information for identifying a vending machine (20), and a payment processing execution unit (104) configured to execute payment processing for receiving provision of a product or a service from the vending machine (20). A management device (30), which is a device separate from the vending machine (20) and the mobile terminal (10), includes an identification information reception unit (303) configured to receive the identification information acquired by the identification information acquisition unit (101), a notification information reception unit (305) configured to receive predetermined notification information, which is transmitted to the management device (30) when payment processing is complete, and a provision permission unit
(Continued)

(306) configured to permit, when the notification information is received, the vending machine (20) identified based on the identification information to provide the product or the service.

11 Claims, 19 Drawing Sheets

(51) Int. Cl.
*G06Q 20/32* (2012.01)
*G06Q 20/40* (2012.01)

(58) Field of Classification Search
CPC ...... G06Q 20/327; G06Q 20/32; G07F 9/001; G07F 9/006; G07F 9/002
USPC .......................................................... 705/21
See application file for complete search history.

(56) References Cited

U.S. PATENT DOCUMENTS

| | | |
|---|---|---|
| 2014/0207277 A1 | 7/2014 | Broome |
| 2015/0100152 A1* | 4/2015 | Barragan Trevino ..... G07F 9/10 700/232 |
| 2019/0251562 A1* | 8/2019 | Dabiri .................... G06Q 50/01 |

FOREIGN PATENT DOCUMENTS

| | | |
|---|---|---|
| JP | 2003-217008 A | 7/2003 |
| JP | 2005-141754 A | 6/2005 |
| JP | 2015-518606 A | 7/2015 |

OTHER PUBLICATIONS

The International Search Report for PCT/JP2016/076032 dated Oct. 18, 2016 with its translation.

* cited by examiner

FIG.5

| VENDING MACHINE ID | D1 |
|---|---|
| POSITION INFORMATION | ------ |

FIG.6

| ACCOMMODATION UNIT NO. | PRODUCT ID | NAME | PRICE | STOCK |
|---|---|---|---|---|
| 1 | P1 | COFFEE A | 130 | 12 |
| 2 | P2 | TEA B | 130 | 11 |
| ... | ... | ... | ... | ... |

FIG.7

| VENDING MACHINE ID | POSITION INFORMATION | COMMUNICATION ADDRESS INFORMATION |
|---|---|---|
| D1 | ----- | ----- |
| D2 | ----- | ----- |
| ... | ... | ... |

FIG.8

| PAYMENT NO | RECEPTION DATE AND TIME | VENDING MACHINE ID | PRODUCT ID | NAME | PRICE | STATUS FLAG |
|---|---|---|---|---|---|---|
| 1 | 2016/05/01 10:00:00 | D1 | P1 | COFFEE A | 130 | 0 |
| ... | ... | ... | ... | ... | ... | ... |

FIG.17

| | VENDING MACHINE ID : D2 | | | |
|---|---|---|---|---|
| VENDING MACHINE ID : D1 | | | | |
| ACCOMMODATION UNIT NO. | PRODUCT ID | NAME | PRICE | STOCK |
| 1 | P1 | COFFEE A | 130 | 12 |
| 2 | P2 | TEA B | 130 | 11 |
| ... | ... | ... | ... | ... |

VENDING MACHINE MANAGEMENT SYSTEM, VENDING MACHINE MANAGEMENT METHOD, MANAGEMENT DEVICE, PORTABLE TERMINAL, AND PROGRAM

TECHNICAL FIELD

The present invention relates to a vending machine management system, a vending machine management method, a management device, a mobile terminal, and a program.

BACKGROUND ART

There is known a system allowing reception of provision of a product or a service by a vending machine with payment means other than cash by using a mobile terminal. For example, in Patent Literature 1, there is disclosed a system allowing a product sold by a vending machine to be purchased by paying with electronic money by direct communication between a mobile terminal and the vending machine via short-range wireless communication (e.g., Bluetooth (registered trademark) or IrDA).

CITATION LIST

Patent Literature

[PTL 1] JP 2003-085464 A

SUMMARY OF INVENTION

Technical Problem

In such a system as that described above, in order to implement the above-mentioned function, each vending machine is required to have a component for direct communication to and from the mobile terminal via short-range wireless communication. For this reason, when an attempt is made to implement the above-mentioned function on each of the vending machines installed at many places, costs may be increased.

The present invention has been made in view of the above-mentioned problem. It is an object of the present invention to provide a vending machine management system, a vending machine management method, a management device, a mobile terminal, and a program, which allow reception of provision of a product or a service by a vending machine with payment means other than cash by using a mobile terminal while suppressing cost of each vending machine.

Solution to Problem

In order to solve the above-mentioned problem, according to one embodiment of the present invention, there is provided a vending machine management system including: a vending machine configured to provide a product or a service; a mobile terminal; and a management device, which is a device separate from the vending machine and the mobile terminal, the mobile terminal including: identification information acquisition means for acquiring identification information for identifying the vending machine; and payment processing execution means for executing payment processing for receiving provision of a product or a service from the vending machine, the management device including: identification information reception means for receiving the identification information acquired by the identification information acquisition means; notification information reception means for receiving predetermined notification information, which is transmitted to the management device when the payment processing is complete; and provision permission means for permitting, when the predetermined notification information is received, the vending machine identified based on the identification information to provide the product or the service.

Further, according to one embodiment of the present invention, there is provided a vending machine management method including: an identification information acquisition step of acquiring, by a mobile terminal, identification information for identifying a vending machine; a payment processing execution step of executing, by the mobile terminal, payment processing for receiving provision of a product or a service from the vending machine; an identification information reception step of receiving the identification information by a management device, the management device being a device separate from the vending machine and the mobile terminal; a notification information reception step of receiving, by the management device, predetermined notification information, which is transmitted to the management device when the payment processing is complete; and a provision permission step of permitting, by the management device, when the predetermined notification information is received, the vending machine identified based on the identification information to provide the product or the service.

Further, according to one embodiment of the present invention, there is provided a management device, which is a device separate from a vending machine and a mobile terminal, the management device including: identification information reception means for receiving identification information for identifying the vending machine; notification information reception means for receiving predetermined notification information, which is transmitted to the management device when payment processing for receiving provision of a product or a service from the vending machine has been executed by the mobile terminal; and provision permission means for permitting, when the predetermined notification information is received, the vending machine identified based on the identification information to provide the product or the service.

Further, according to one embodiment of the present invention, there is provided a mobile terminal including: identification information acquisition means for acquiring identification information for identifying a vending machine; payment processing execution means for executing payment processing for receiving provision of a product or a service from the vending machine; and notification information transmission means for transmitting predetermined notification information to a management device when the payment processing is complete, the management device, which has received the predetermined notification information, being configured to permit the vending machine identified based on the identification information to provide the product or the service.

Further, according to one embodiment of the present invention, there is provided a program for causing a mobile terminal to function as: identification information acquisition means for acquiring identification information for identifying a vending machine; payment processing execution means for executing payment processing for receiving provision of a product or a service from the vending machine; and notification information transmission means for transmitting predetermined notification information to a management device when the payment processing is complete, the management device, which has received the predetermined notification information, being configured to permit the vending machine identified based on the identification information to provide the product or the service.

Further, an information storage medium according to one embodiment of the present invention is a computer-readable information storage medium having the above-mentioned program recorded thereon.

Further, in one aspect of the present invention, when the predetermined notification information is received and it is determined based on a predetermined determination criterion that the mobile terminal and the vending machine identified based on the identification information are in proximity to each other, the provision permission means may permit the vending machine identified based on the identification information to provide the product or the service.

Further, in one aspect of the present invention, the vending machine may include beacon transmission means for transmitting a beacon indicating the identification information, the mobile terminal may include beacon reception means for receiving the beacon, and the identification information acquisition means may be configured to acquire the identification information based on the beacon.

Further, in one aspect of the present invention, the predetermined determination criterion may include a determination criterion for determining whether the mobile terminal and the vending machine identified based on the identification information are in proximity to each other based on whether a reception strength of the beacon at the mobile terminal is equal to or more than a threshold value.

Further, in one aspect of the present invention, the mobile terminal may include: product/service information acquisition means for acquiring information on the product or the service to be provided by the vending machine; and selection screen display control means for displaying, based on the information acquired by the product/service information acquisition means, on display means of the mobile terminal, a selection screen for selecting as a purchase target any one of the product and the service to be provided by the vending machine, the payment processing execution means may be configured to execute the payment processing for receiving provision of the one of the product and the service selected as the purchase target, and the provision permission means may be configured to permit the vending machine identified based on the identification information to provide the one of the product and the service selected as the purchase target.

Further, in one aspect of the present invention, the beacon transmission means may include means for transmitting a beacon indicating the product or the service to be provided by the vending machine, and the product/service information acquisition means may be configured to acquire, based on the beacon, information on the product or the service to be provided by the vending machine.

Further, in one aspect of the present invention, the product/service information acquisition means may be configured to transmit the identification information to the management device, to thereby acquire from the management device information on the product or the service to be provided by the vending machine identified based on the identification information.

Further, in one aspect of the present invention, the mobile terminal may include means for displaying a screen indicating a position of the vending machine on display means of the mobile terminal.

Further, in one aspect of the present invention, the mobile terminal may include means for displaying, when a product having no stock is included among products to be provided by the vending machine, a screen indicating another vending machine having stock of the product on display means of the mobile terminal.

Further, in one aspect of the present invention, the vending machine may include identification information provision means for providing the identification information to the mobile terminal, the identification information acquisition means may be configured to acquire the identification information provided by the identification information provision means, and the identification information provision means may be subsequently added to the vending machine.

Advantageous Effects of Invention

According to the embodiments of the present invention, it is possible to allow reception of provision of a product or a service by a vending machine with payment means other than cash by using a mobile terminal while suppressing the cost of each vending machine.

BRIEF DESCRIPTION OF DRAWINGS

FIG. 5 is a diagram for showing an example of a basic information table.

FIG. 6 is a diagram for showing an example of a product-for-sale table.

FIG. 7 is a diagram for showing an example of a vending machine table.

FIG. 8 is a diagram for showing an example of a payment information table.

FIG. 17 is a diagram for illustrating an example of a product-for sale table.

DESCRIPTION OF EMBODIMENTS

Now, exemplary embodiments of the present invention are described in detail with reference to the drawings.

1. First Embodiment

Firstly, a first embodiment of the present invention is described.

[1-1. System Configuration]

Figure 1:
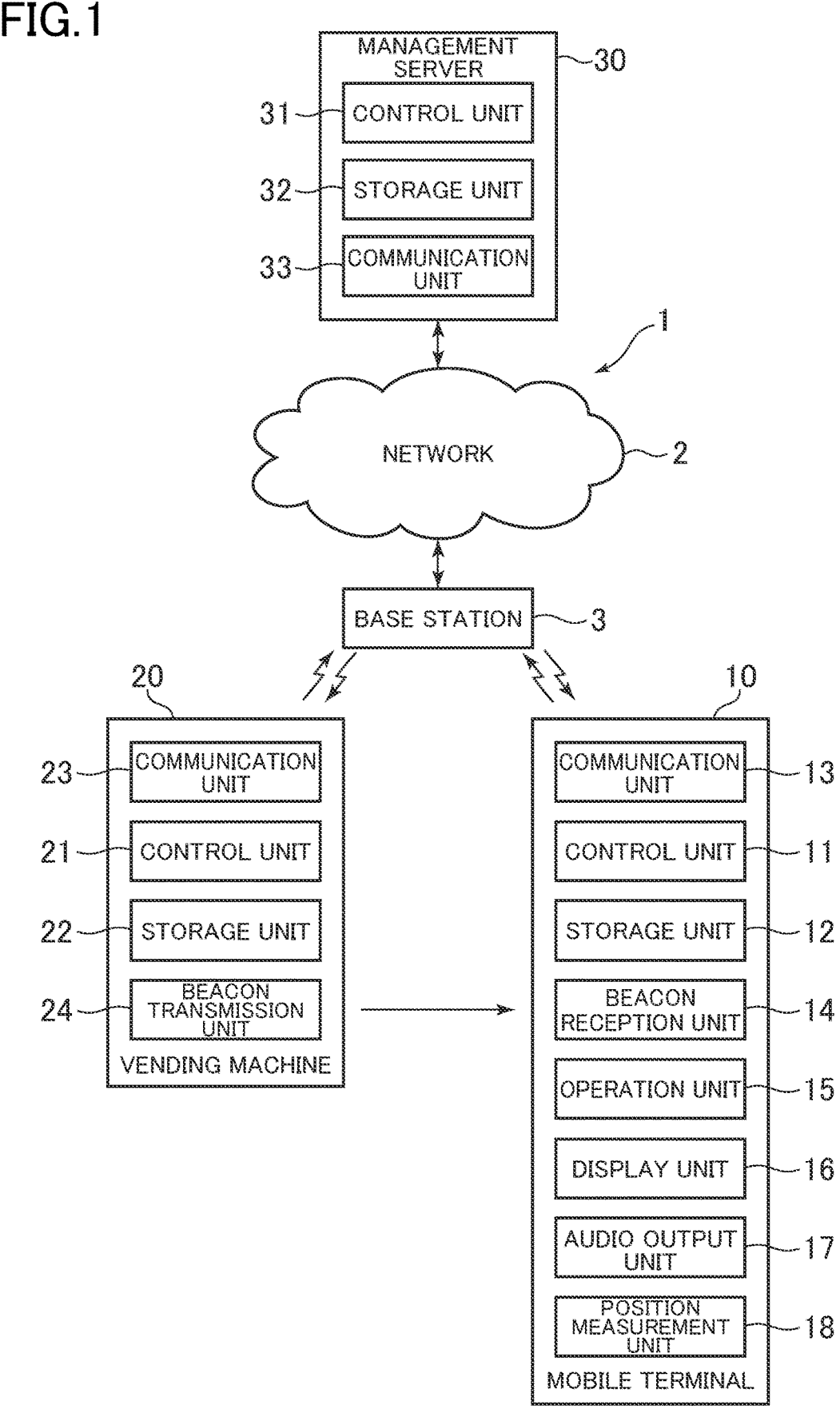
FIG. 1 is a diagram for illustrating an example of a configuration of a vending machine management system according to first to third embodiments of the present invention.

FIG. 1 is a diagram for illustrating an example of a configuration of a vending machine management system according to the first embodiment of the present invention. As illustrated in FIG. 1, a vending machine management system. 1 includes a mobile terminal 10, a vending machine 20, and a management server 30.

The mobile terminal 10 is a mobile information processing device to be used by a user. For example, the mobile terminal 10 is a cell phone (including smartphone) or a tablet computer. As illustrated in FIG. 1, the mobile terminal 10 includes a control unit 11, a storage unit 12, a communication unit 13, a beacon reception unit 14, an operation unit 15, a display unit 16, an audio output unit 17, and a position measurement unit 18.

The control unit 11 includes one or a plurality of microprocessors, and executes information processing in accordance with a program stored in the storage unit 12. The storage unit 12 includes a main storage unit (e.g., RAM) and an auxiliary storage unit (e.g., ROM, hard disk drive, and solid state drive), and stores programs to be executed by the control unit 11. The storage unit 12 also operates as a work memory of the control unit 11.

The communication unit 13 is a unit for communication via a network 2, for example, the Internet. For example, the communication unit 13 has a wireless communication interface for wirelessly communicating to and from a base station 3. The mobile terminal 10 is connected to the network 2 via the base station 3. The beacon reception unit 14 is a unit for receiving a beacon transmitted from the vending machine 20.

The operation unit 15 is used by the user to perform an operation. The display unit 16 is, for example, a liquid crystal display unit or an organic EL display unit, and displays various screens in accordance with instructions from the control unit 11. In FIG. 1, the operation unit 15 and the display unit 16 are illustrated separately, but the operation unit 15 and the display unit 16 may also be integrally configured as a so-called touch panel. In this case, the user can perform various operations by touching the touch panel with, for example, a finger or a touch pen. It is not always required to integrally configure the operation unit 15 and the display unit 16 as a touch panel, and the operation unit 15 may be an operation element arranged separately from the display unit 16, such as a button, a key, or a lever (stick).

The audio output unit 17 is, for example, a speaker or headphones, and outputs various kinds of audio in accordance with instructions from the control unit 11. The position measurement unit 18 is a unit for measuring the position of the mobile terminal 10. For example, the position measurement unit 18 receives a signal transmitted from each of a plurality of GPS satellites and measures the position of the mobile terminal 10 based on those signals.

The programs and data are supplied to the storage unit 12 via the network 2. The mobile terminal 10 may include a component (e.g., optical disc drive unit or memory card slot unit) for reading out a program or data stored on an information storage medium (e.g., optical disc or memory card). The programs and data may also be supplied to the storage unit 12 via the information storage medium.

The vending machine 20 is a vending machine configured to provide a product or a service. In the following, there is described a case in which the vending machine 20 sells one or a plurality of beverages (example of product). However, the vending machine 20 may sell a product (e.g., food) other than a beverage. The vending machine 20 may also be a machine for providing a service. For example, the vending machine 20 may be a machine for selling a transportation ticket, or may be installed in an unmanned parking lot.

As illustrated in FIG. 1, the vending machine 20 includes a control unit 21, a storage unit 22, a communication unit 23, and a beacon transmission unit 24. The beacon transmission unit 24 is a unit for transmitting a beacon. The vending machine 20 does not include a beacon reception unit. Thus, the vending machine 20 can transmit beacons, but is not capable of receiving beacons transmitted from another device. The control unit 21, the storage unit 22, and the communication unit 23 are the same as the control unit 11, the storage unit 12, and the communication unit 13 of the mobile terminal 10. However, the communication unit 23 may include a wired communication interface, and the vending machine 20 may be connected to the network 2 via the wired communication interface. The vending machine 20 may also include an operation unit, a display unit, an audio output unit, and a position measurement unit that are the same as the operation unit 15, the display unit 16, the audio output unit 17, and the position measurement unit 18.

The management server 30 is a device separate from the vending machine 20, and is a server computer to be used for management of the vending machine 20. As illustrated in FIG. 1, the management server 30 includes a control unit 31, a storage unit 32, and a communication unit 33. The control unit 31 and the storage unit 32 are the same as the control unit 11 and the storage unit 12 of the mobile terminal 10. The communication unit 33 is a unit for communication via the network 2. The communication unit 33 includes a wired communication interface, and the management server 30 is connected to the network 2 via the wired communication interface. The communication unit 33 may also include a wireless communication interface, and the management server 30 may be connected to the network 2 via the wireless communication interface.

The management server 30 may include a component (e.g., optical disc drive unit or memory card slot unit) for reading out a program or data stored on an information storage medium (e.g., optical disc or memory card). The programs and data may be supplied to the storage unit 32 via the information storage medium. The programs and data may also be supplied to the storage unit 32 via the network 2.

The mobile terminal 10 and the management server 30 can communicate to and from each other via the network 2.

The vending machine 20 and the management server 30 can also communicate to and from each other via the network 2.

[1-2. Outline of Functions]

Figure 2:
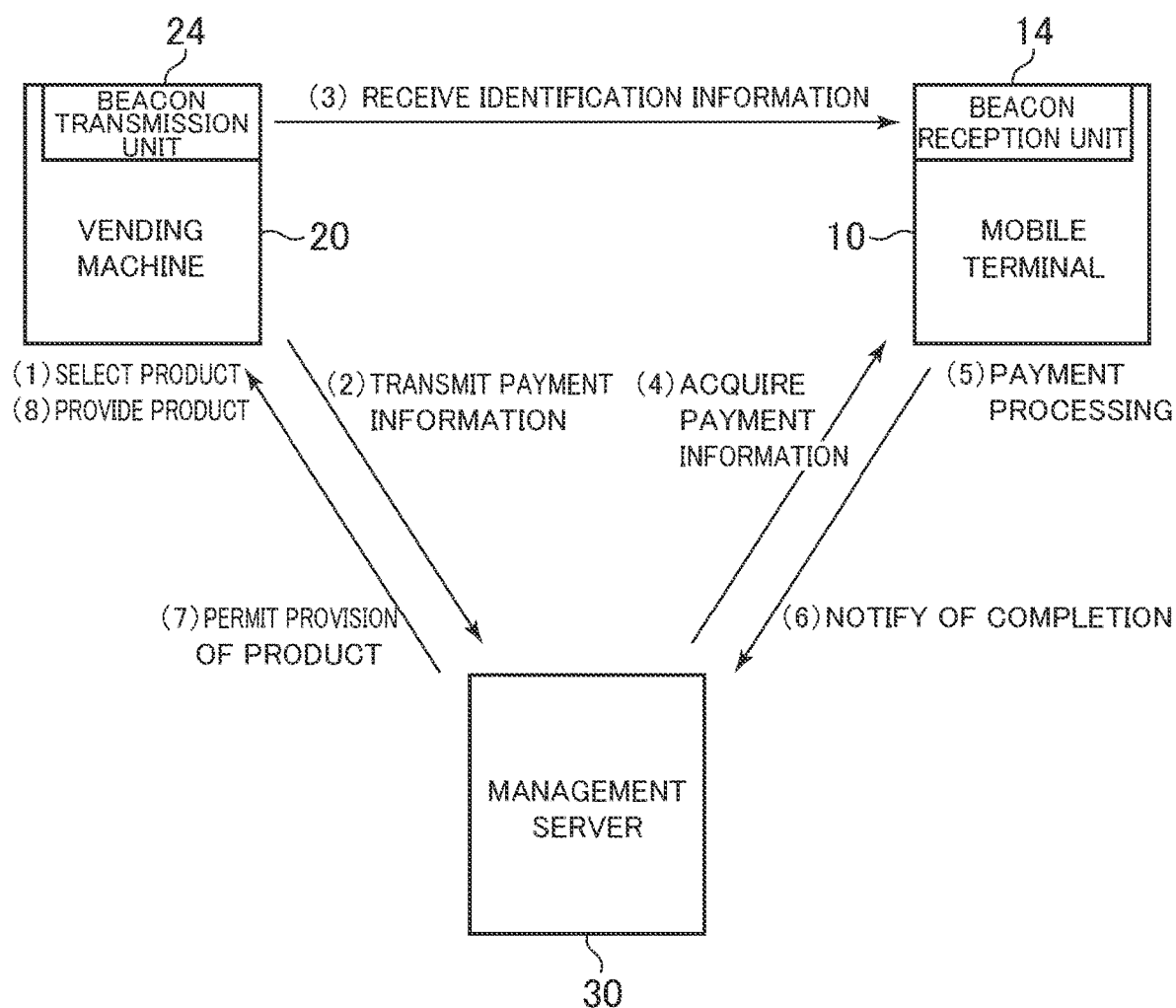
FIG. 2 is a diagram for illustrating an example of a flow until a user obtains a product in the vending machine management system according to the first embodiment.

With the vending machine management system 1, it is possible to purchase a product sold by the vending machine 20 with payment means other than cash by using the mobile terminal 10. FIG. 2 is a diagram for illustrating a flow until the user obtains a product.

(1) First, the user selects a product to be purchased at the vending machine 20. The vending machine 20 includes a plurality of buttons respectively corresponding to a plurality of products sold by the vending machine 20. The user selects a desired product by pressing any one of the plurality of buttons.

(2) When the user selects the product to be purchased, the vending machine 20 transmits payment information to the management server 30 via the network 2. For example, a product ID, a name, and a price of the product to be purchased are transmitted to the management server 30 as "payment information" together with a vending machine ID of the vending machine 20. At the management server 30, the payment information is stored in association with the vending machine ID. The vending machine ID is information unique to each vending machine 20, and is information for uniquely identifying each vending machine 20. The product ID is information unique to each product, and is information for uniquely identifying each product.

(3) The beacon transmission unit 24 of the vending machine 20 transmits a beacon indicating identification information (e.g., vending machine ID and position information) on the vending machine 20 every predetermined time period (e.g., several seconds). This beacon reaches within a range near the vending machine 20 (e.g., range within 10 m from vending machine 20) and is received by the beacon reception unit 14 of the mobile terminal 10 near the vending machine 20.

(4) When the identification information on the vending machine 20 is received by the mobile terminal 10, the mobile terminal 10 acquires payment information from the management server 30 via the network 2 based on the identification information. For example, when the mobile terminal 10 transmits the vending machine ID to the management server 30, the payment information (e.g., product ID, name, and price of product to be purchased) stored in association with the vending machine ID is transmitted back from the management server 30 to the mobile terminal 10.

Figure 3:
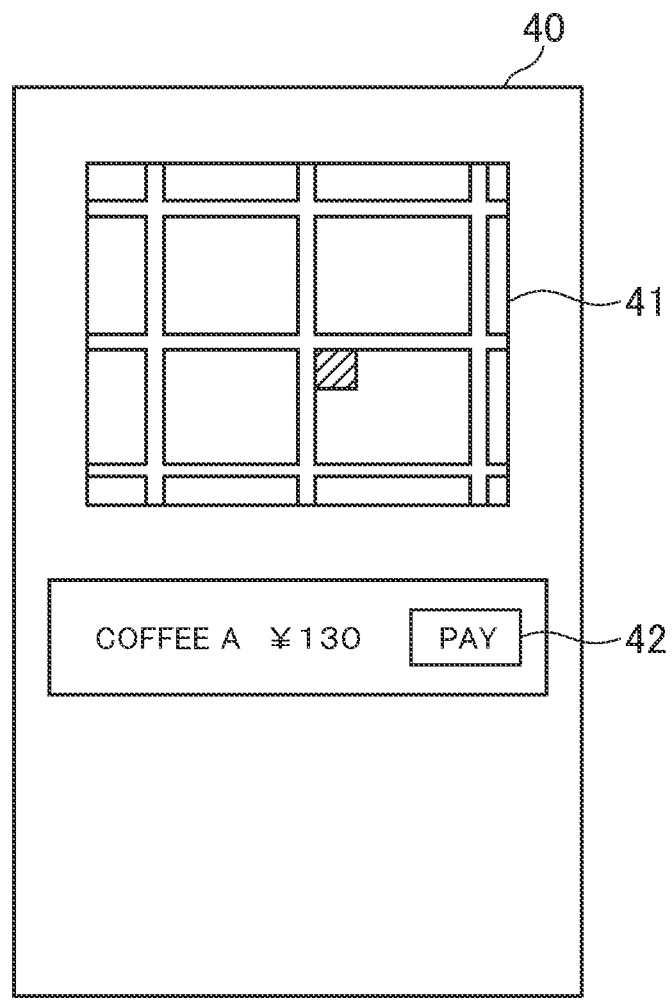
FIG. 3 is a diagram for illustrating an example of a payment screen.

(5) When the payment information is obtained, the mobile terminal 10 executes payment processing. For example, the mobile terminal 10 displays a payment screen on the display unit 16. FIG. 3 is a diagram for illustrating an example of the payment screen. As illustrated in FIG. 3, a payment screen 40 displays position information on the vending machine 20 and the payment information. Specifically, a map 41 indicating the position of the vending machine 20 is displayed on the payment screen 40. The name and the price of the product to be purchased are also displayed on the payment screen 40. A payment button 42 is displayed in association with the name and the price of the product to be purchased. The payment button 42 is a button for executing payment processing of the product to be purchased. When the payment button 42 is selected, the payment processing of the product to be purchased is executed. In the payment processing, payment using payment means other than cash (e.g., credit card, electronic money, or points) is executed. For example, the mobile terminal 10 transmits a payment request to a payment server configured to execute payment. In this case, payment is executed by the payment server, and when payment is complete, the mobile terminal 10 is notified that payment is complete.

(6) When the payment processing is complete, the mobile terminal 10 transmits to the management server 30 completion notification information indicating that the payment processing of the product to be purchased is complete.

(7) When the completion notification information is received by the management server 30, the management server 30 transmits to the vending machine 20 via the network 2 permission notification information indicating that provision of the product to be purchased is permitted.

(8) When the permission notification information is received by the vending machine 20, the vending machine 20 provides to the user the product to be purchased by dispensing the product to be purchased to a product dispensing port.

The user can obtain the product to be purchased in the manner described above. Specifically, with the vending machine management system 1, the user can purchase a product sold by the vending machine 20 with payment means other than cash by using the mobile terminal 10. Usually, an existing vending machine 20 already has hardware such as the control unit 21, the storage unit 22, and the communication unit 23 in order to manage stock and monitor malfunctions, for example. Therefore, the hardware to be added to each vending machine 20 in order to implement the above-mentioned functions is the beacon transmission unit 24, which is hardware that can be implemented relatively inexpensively. As a result, with the vending machine management system 1, the above-mentioned functions can be implemented while suppressing the costs of the hardware to be added to each vending machine 20.

[1-3. Function Blocks]

Figure 4:
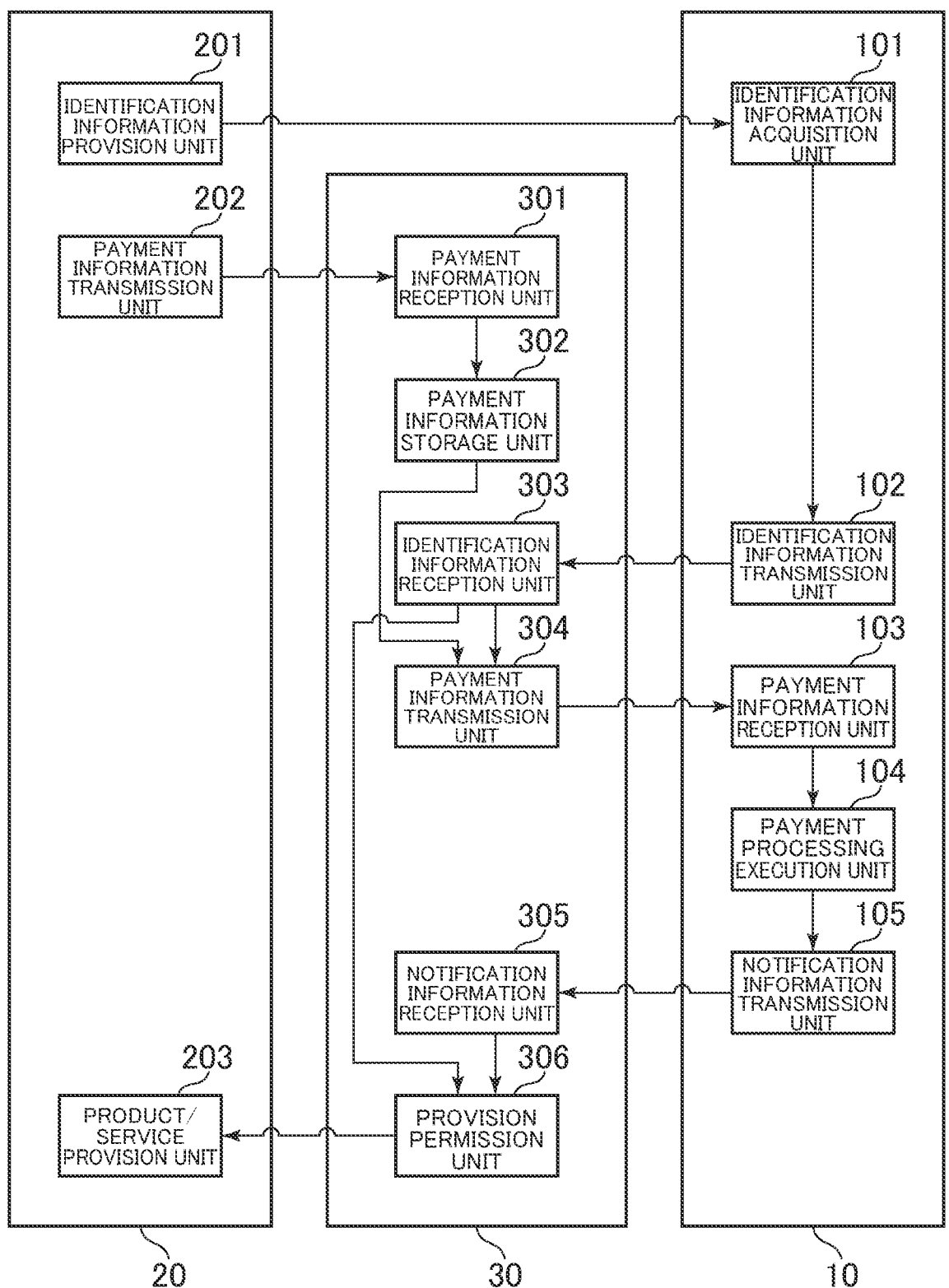
FIG. 4 is a function block diagram for illustrating an example of functions to be implemented by the vending machine management system according to the first embodiment.

Next, a configuration for implementing the above-mentioned functions is described. FIG. 4 is a function block diagram for illustrating function blocks to be implemented by the vending machine management system 1 according to the first embodiment.

As illustrated in FIG. 4, the mobile terminal 10 includes an identification information acquisition unit 101 (identification information acquisition means), an identification information transmission unit 102, a payment information reception unit 103, a payment processing execution unit 104 (payment processing execution means), and a notification information transmission unit 105. Those units are mainly implemented by the control unit 11.

The vending machine 20 includes an identification information provision unit 201 (identification information provision means), a payment information transmission unit 202, and a product/service provision unit 203. For example, the identification information provision unit 201 is implemented by the beacon transmission unit 24, and the other function blocks are mainly implemented by the control unit 21.

The management server 30 (management device) includes a payment information reception unit 301, a payment information storage unit 302, an identification information reception unit 303 (identification information reception means), a payment information transmission unit 304, a notification information reception unit 305 (notification information reception means), and a provision permission unit 306 (provision permission means). For example, the payment information storage unit 302 is implemented by the storage unit 32, and the other function blocks are mainly implemented by the control unit 31. The payment information storage unit 302 may also be implemented by another storage device accessible from the management server 30.

[1-3-1] Before the above-mentioned function blocks are described, information stored in advance in the vending machine 20 and the management server 30 is described.

FIG. 5 and FIG. 6 are each a table for showing an example of information stored in advance in the storage unit 22 of the vending machine 20. Those pieces of information may also be stored in another storage device accessible from the vending machine 20.

FIG. 5 is a diagram for showing an example of a basic information table. The basic information table indicates basic information on the vending machine 20. As shown in FIG. 5, the basic information table includes a "vending machine ID" field and a "position information" field. The "vending machine ID" field indicates information for uniquely identifying each vending machine 20. The "position information" field indicates the position of the vending machine 20. For example, a latitude and longitude of the vending machine 20 or an address of an installation place of the vending machine 20 is registered in the "position" field.

FIG. 6 is a diagram for showing an example of a product-for-sale table. In the product-for-sale table, a list of the products sold by the vending machines 20 is shown. As shown in FIG. 6, the product-for-sale table includes an "accommodation unit No." field, a "product ID" field, a "name" field, a "price" field, and a "stock" field. The vending machine 20 includes a plurality of accommodation units for accommodating a plurality of products. The "accommodation unit No." field indicates information for uniquely identifying each accommodation unit. The "product ID" field indicates the product ID of the product accommodated in the accommodation unit. The "product ID" field indicates information for uniquely identifying each product. For the same product, even when the product is sold by different vending machines 20, the product ID is the same. The "name", "price", and "stock" fields indicate the name, price, and stock quantity of the product stored in accommodation unit.

FIG. 7 is a table for showing an example of information stored in advance in the storage unit 32 of the management server 30. The information may also be stored on another storage device accessible from the management server 30.

FIG. 7 is a diagram for showing an example of a vending machine table. In the vending machine table, a list of vending machines 20 installed at each place is shown. As shown in FIG. 7, the vending machine table includes a "vending machine ID" field, a "position information" field, and a "communication address information" field. The "vending machine ID" field indicates information for uniquely identifying each vending machine 20. The "position information" fields indicates the position of the vending machine 20. The "communication address information" field indicates communication address information (e.g., IP address) required for communication to and from the vending machine 20 via the network 2.

[1-3-2] The identification information provision unit 201 is a unit for providing to the mobile terminal 10 identification information for identifying the vending machine 20. The identification information acquisition unit 101 acquires the identification information provided by the identification information provision unit 201.

For example, the identification information provision unit 201 is the beacon transmission unit 24, and transmits a beacon indicating the vending machine ID and the position information (example of identification information) of the vending machine 20. The identification information acquisition unit 101 acquires the vending machine ID and the position information of the vending machine 20 based on the beacon received by the beacon reception unit 14.

[1-3-3] When the user desires provision of a product or a service by the vending machine 20, the payment information transmission unit 202 transmits payment information via the communication unit 23. The payment information reception unit 301 receives the payment information via the communication unit 33. The payment information reception unit 301 stores the received payment information in the payment information storage unit 302. The "payment information" is information required to execute the payment processing for receiving provision of the product or the service.

For example, when a product to be purchased has been selected at the vending machine 20, the payment information transmission unit 202 transmits to the management server 30 the product ID, the name, and the price of the product to be purchased as the payment information together with the vending machine ID of the vending machine 20. The payment information reception unit 301 receives those pieces of information, and stores the payment information (product ID, name, and price of product to be purchased) in association with the vending machine ID in the payment information storage unit 302.

FIG. 8 is a diagram for showing an example of a payment information table stored in the payment information storage unit 302. As shown in FIG. 8, the payment information table includes a "payment No." field, a "reception date and time" field, a "vending machine ID" field, a "product ID" field, a "name" field, a "price" field, and a "status flag" field. The "payment No." field indicates information for uniquely identifying each piece of payment information. The "reception date and time" field indicates the date and the time at which the payment information is received. In the "vending machine ID", the vending machine ID received together with the payment information is registered. In the "product ID", "name", and "price" fields, the product ID, the name, and the price of the product to be purchased received as the payment information are registered, respectively. The "status flag" field indicates an execution status of the payment processing related to the payment information. For example, a value of "0" or "1" is registered in the "status flag" field. A value of "0" indicates that payment processing has not been executed, and a value of "1" indicates that payment processing is complete.

When payment information is received, the payment information reception unit 301 adds a new record to the payment information table. The payment information reception unit 301 registers, in each appropriate field of the new record, a payment No. to be assigned so as not to overlap with an existing payment No., the current date and time, the vending machine ID received together with the payment information, the product ID, name, and price of the product to be purchased received as the payment information, and the value "0".

[1-3-4] The identification information transmission unit 102 transmits, via the communication unit 13, the identification information acquired by the identification information acquisition unit 101. The identification information reception unit 303 receives the identification information via the communication unit 33.

For example, the identification information transmission unit 102 transmits a vending machine ID acquired by the identification information acquisition unit 101, and the identification information reception unit 303 receives the vending machine ID.

[1-3-5] The payment information transmission unit 304 acquires from the payment information storage unit 302 payment information associated with the identification information received by the identification information reception unit 303, and transmits the payment information via the communication unit 33. The payment information reception unit 103 receives the payment information via the communication unit 13.

For example, the payment information transmission unit 304 accesses the payment information table to read payment information that is stored in association with the vending machine ID received by the identification information reception unit 303 and that has a payment status flag of "0", and transmits the read payment information to the mobile terminal 10. For example, the payment No., the product ID, the name, and the price are transmitted to the mobile terminal 10.

[1-3-6] The payment processing execution unit 104 executes payment processing for receiving provision of the product or the service from the vending machine 20. The payment processing execution unit 104 executes payment processing based on the payment information received by the payment information reception unit 103.

For example, the payment processing execution unit 104 displays the payment screen 40 on the display unit 16. When the payment button 42 is selected, the payment processing execution unit 104 executes payment processing. For example, the payment processing execution unit 104 transmits a payment request to the payment server configured to execute payment. In this case, after user authentication processing and the like required to execute payment are executed, payment is executed at the payment server, and when payment is complete, the mobile terminal 10 is notified that payment is complete.

[1-3-7] The notification information transmission unit 105 transmits predetermined notification information via the communication unit 13 when the payment processing is complete. The notification information reception unit 305 receives the notification information via the communication unit 33.

For example, the notification information transmission unit 105 transmits to the management server 30 completion notification information indicating that the payment processing is complete. When payment processing related to payment information on a payment No. "1" is complete, the notification information transmission unit 105 transmits completion notification information including the payment No. "1" to the management server 30.

[1-3-8] The provision permission unit 306 permits, when the notification information is received by the notification information reception unit 305, the vending machine 20 identified based on the identification information received by the identification information reception unit 303 to provide a product or a service. The product/service provision unit 203 provides the product or the service in accordance with the permission by the provision permission unit 306.

For example, when completion notification information including the payment No. "1" is received, the provision permission unit 306 refers to the payment information table to acquire a vending machine ID "D1" and a product ID "P1" associated with the payment No. "1". Based on the vending machine table, the provision permission unit 306 transmits via the communication unit 36 to the vending machine 20 having the vending machine ID "D1" permission notification information indicating that provision of the product having the product ID "P1" is permitted. In this case, the product/service provision unit 203 dispenses the product having the product ID "P1" to the product dispensing port.

Figure 9:
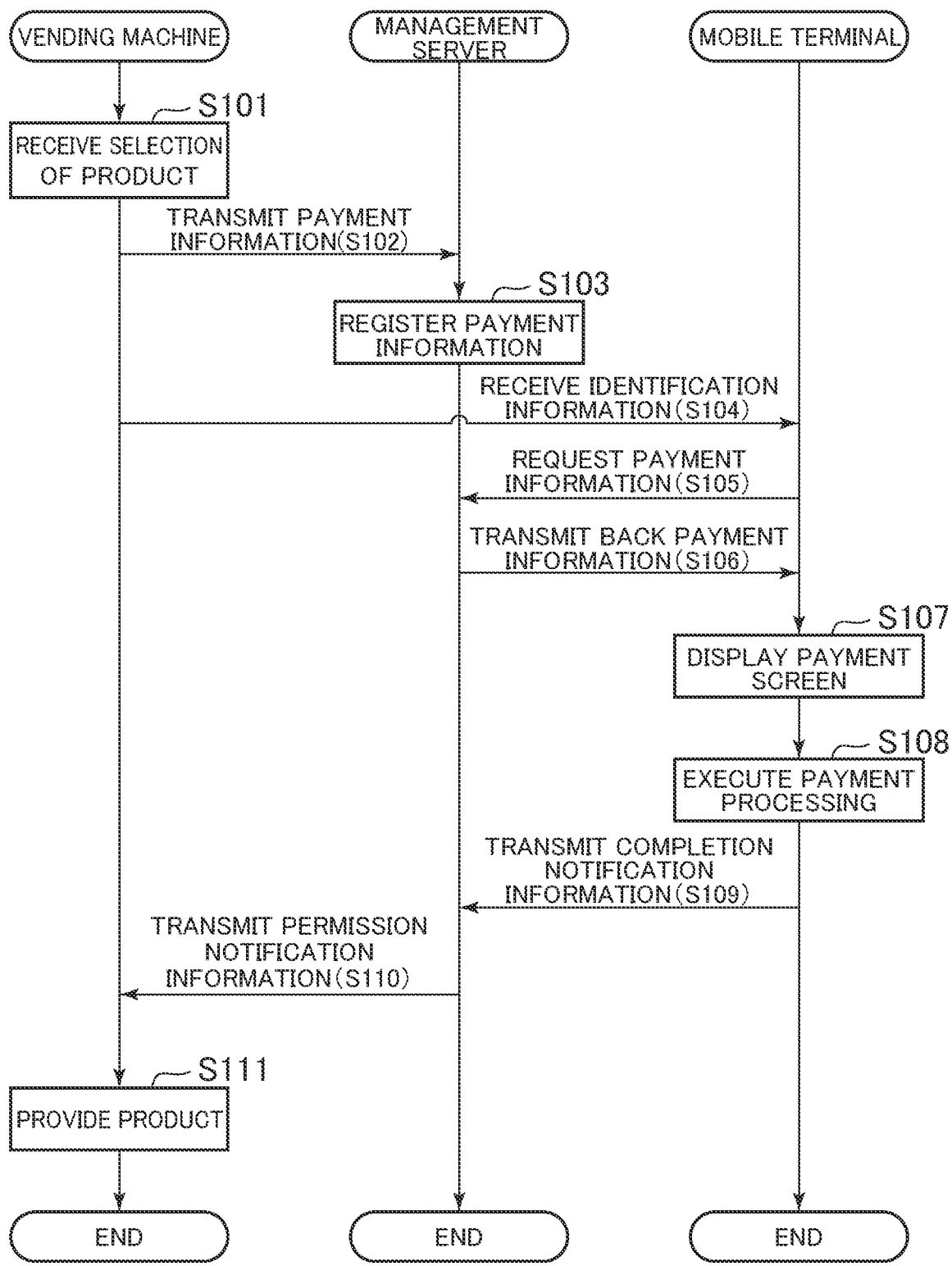
FIG. 9 is a flowchart for illustrating an example of processing to be executed by the vending machine management system according to the first embodiment.

[1-4. Processing] Next, processing to be executed by the vending machine management system 1 is described. FIG. 9 is a flowchart for illustrating an example of processing to be executed by the vending machine management system 1. Through execution of the processing illustrated in FIG. 9 in accordance with programs stored in the storage units 12, 22, and 32, respectively, the control units 11, 21, and 31 function as the function blocks (excluding identification information provision unit 201 and payment information storage unit 302) illustrated in FIG. 4.

As illustrated in FIG. 9, the control unit 21 of the vending machine 20 receives a selection of a product (Step S101). Specifically, when any one of the plurality of buttons respectively corresponding to the plurality of products sold by the vending machine 20 is pressed, the control unit 21 identifies the product corresponding to the pressed button as a product to be purchased.

After the execution of Step S101, the control unit 21 transmits the product ID, the name, and the price of the product to be purchased as payment information to the management server 30 (Step S102). At this time, the payment information is transmitted together with the vending machine ID of the vending machine 20. When the payment information is received by the management server 30, the control unit 31 of the management server 30 registers the payment information in the payment information table (Step S103). Specifically, the control unit 31 adds a new record to the payment information table, and registers the received payment information in the newly added record.

The beacon transmission unit 24 of the vending machine 20 transmits the identification information (vending machine ID and position information) on the vending machine 20 by a beacon, and the mobile terminal 10 receives the identification information (Step S104).

When the identification information on the vending machine 20 is received at the mobile terminal 10, the control unit 11 acquires the payment information from the management server 30 based on the identification information. Specifically, the control unit 11 requests the management server 30 for the payment information associated with the vending machine ID by transmitting the vending machine ID (identification information) to the management server 30 (Step S105). In this case, the control unit 31 of the management server 30 reads out the payment information that is stored in association with the vending machine ID transmitted from the mobile terminal 10 and that has a status flag of "0" from the payment information table, and transmits the read payment information back to the mobile terminal 10 (Step S106). For example, the payment No., the vending machine ID, the product ID, the name, and the price are transmitted back to the mobile terminal 10.

When the payment information is received by the mobile terminal 10, the control unit 11 displays the payment screen 40 on the display unit 16 based on the payment information (Step S107). When the payment button 42 of the payment screen 40 is selected, the control unit 11 executes payment processing based on the payment information received in Step S106 (Step S108). For example, the control unit 11 transmits a payment request to the payment server configured to execute payment. When the mobile terminal 10 is notified from the payment server that payment is complete, the control unit 11 determines that the payment processing is complete.

When the payment processing is complete, the control unit 11 transmits to the management server 30 completion notification information indicating that the payment processing is complete (Step S109). For example, when payment processing related to the payment information on the payment No. "1" is complete, the control unit 11 transmits the payment No. "1" as the completion notification information to the management server 30.

When the completion notification information is received by the management server 30, the control unit 31 transmits to the vending machine 20 permission notification information indicating that provision of the product to be purchased is permitted (Step S110). For example, when the payment No. "1" is received as completion notification information, the control unit 31 accesses the payment information table to update the status flag associated with the payment No. "1" to "1", and to read out the vending machine ID (D1) and the product ID (P1) associated with the payment No. "1". The control unit 31 also refers to the vending machine table to read out the communication address information associated with the vending machine ID "D1". The control unit 31 transmits the product ID "P1" as permission notification information to a destination corresponding to the communication address information.

When the permission notification information is received by the vending machine 20, the control unit 21 provides the product to be purchased based on that permission notification information (Step S111). For example, when the product ID "P1" is received as the permission notification information, the control unit 21 refers to the product-for-sale table and dispenses the product having the product ID "P1" to the product dispensing port.

[1-5. Summary]

With the vending machine management system 1 according to the first embodiment, the user can purchase a product sold by the vending machine 20 with payment means other than cash by using the mobile terminal 10. Usually, an existing vending machine 20 already has hardware such as the control unit 21, the storage unit 22, and the communication unit 23 in order to manage stock and monitor malfunctions, for example. Therefore, the hardware to be added (subsequently added) to each vending machine 20 in order to implement the above-mentioned functions is the beacon transmission unit 24, which is hardware that can be implemented relatively inexpensively. As a result, with the vending machine management system 1, the above-mentioned functions can be implemented while suppressing the costs of the hardware to be added to each vending machine 20.

With the vending machine management system 1, each vending machine 20 is not required to have a component or the like for payment means other than cash. Therefore, with the vending machine management system 1, even for a vending machine 20 having a comparatively simple configuration, it is possible to purchase a product sold by the vending machine 20 with payment means other than cash.

In the vending machine management system 1, information on the user is not stored in the vending machine 20, and therefore there is no risk of user information being leaked even when the vending machine 20 is forced open by illegitimate means.

2. Second Embodiment

Next, a second embodiment of the present invention is described.

[2-1. System Configuration]

A vending machine management system 1 according to the second embodiment has the same configuration as that of the first embodiment (see FIG. 1).

[2-2. Outline of Functions]

Figure 10:
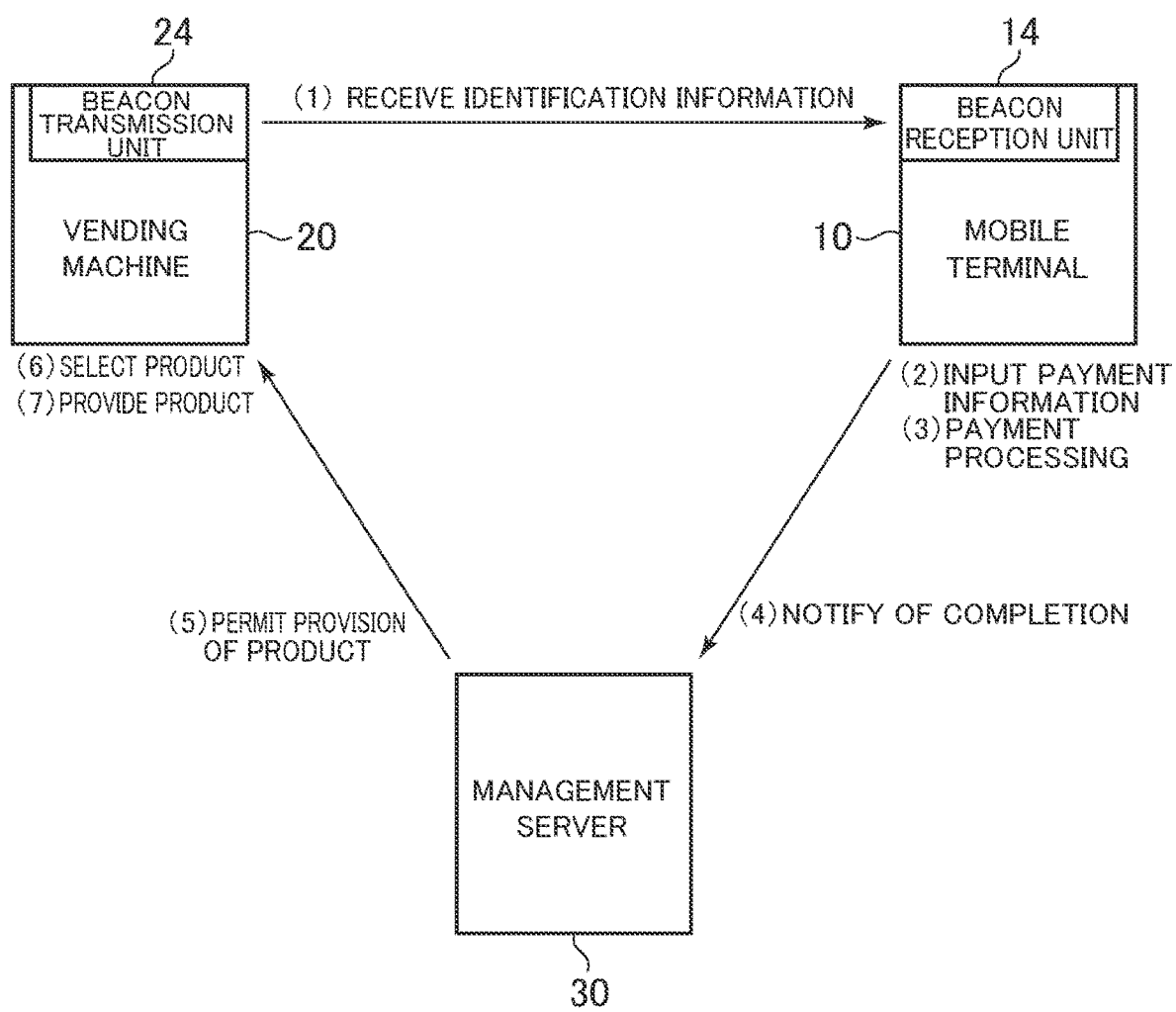
FIG. 10 is a diagram for illustrating an example of a flow until the user obtains a product in the vending machine management system according to the second embodiment.

In the first embodiment, payment processing is executed after the product to be purchased is selected, but in the second embodiment, the product to be purchased is selected after payment processing is executed. FIG. 10 is a diagram for illustrating a flow until the user obtains a product in the second embodiment.

(1) Similarly to the first embodiment, the beacon transmission unit 24 of the vending machine 20 transmits a beacon indicating identification information (e.g., vending machine ID and position information) on the vending machine 20 every predetermined time period. The beacon is received by the beacon reception unit 14 of the mobile terminal 10, which is in the vicinity of the vending machine 20.

Figure 11:
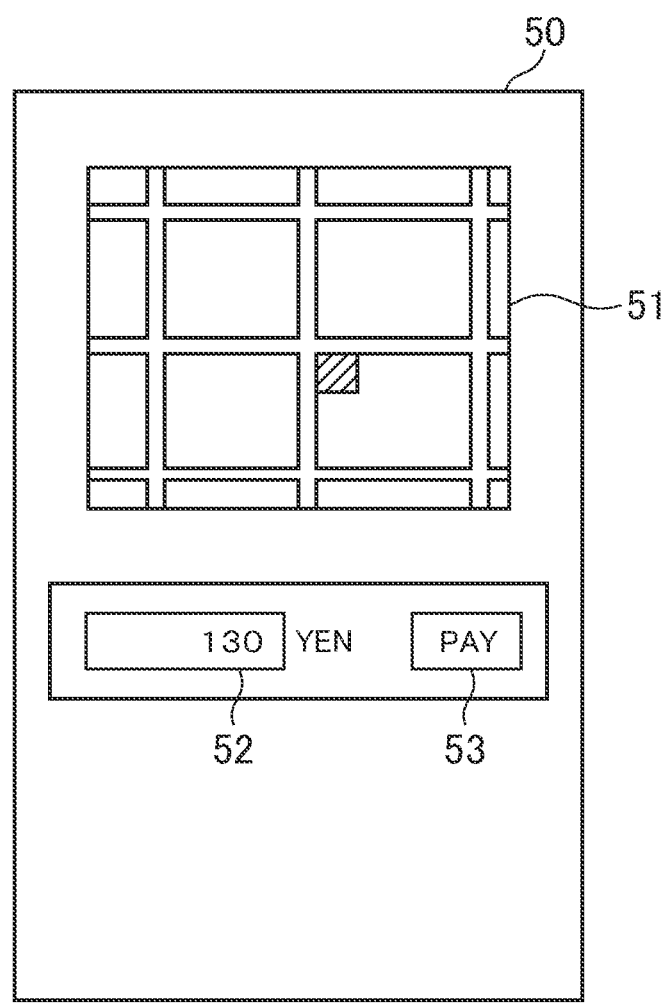
FIG. 11 is a diagram for illustrating an example of a payment information input screen.

(2) (3) When the identification information on the vending machine 20 is received by the mobile terminal 10, the mobile terminal 10 receives input of payment information. For example, the mobile terminal 10 displays on the display unit 16 a payment information input screen for receiving input of payment information. FIG. 11 is a diagram for illustrating an example of the payment information input screen. As illustrated in FIG. 11, position information on the vending machine 20 is displayed on the payment information input screen 50. Specifically, a map 51 indicating the position of the vending machine 20 is displayed on the payment information input screen 50. A form 52 for inputting a payment amount and a payment button 53 are also displayed on the payment information input screen 50. The user inputs the price of the product he or she wishes to purchase as a payment amount in the form 52, and selects the payment button 53. When the payment button 53 is selected, the mobile terminal 10 executes payment processing. In the payment processing, payment using payment means other than cash (e.g., credit card, electronic money, or points) is executed. For example, the mobile terminal 10 transmits a payment request to the payment server configured to execute payment. In this case, payment is executed at the payment server, and when payment is complete, the mobile terminal 10 is notified that payment is complete.

(4) When the mobile terminal 10 is in proximity to the vending machine 20 when the payment processing is complete, the mobile terminal 10 transmits to the management server 30 completion notification information indicating that the payment processing is complete.

(5) When the completion notification information is received by the management server 30, the management server 30 transmits to the vending machine 20 via the network 2 permission notification information indicating that provision of a product having a price corresponding to a payment amount is permitted.

(6) (7) When the permission notification information is received by the vending machine 20, the vending machine 20 is in the same state as when coins corresponding to the payment amount have been inserted. In this case, the user can select a desired product within a range of the payment amount. When the desired product is selected, the vending machine 20 dispenses the product to the product dispensing port. When a product having a price less than the payment amount is selected, processing for refunding the difference is executed.

The user can obtain the product to be purchased in the manner described above. With the vending machine management system 1 according to the second embodiment, the user can also purchase a product sold by the vending machine 20 with payment means other than cash by using the mobile terminal 10. The above-mentioned functions can be implemented while suppressing the costs of the hardware to be added to each vending machine 20. Further, with the vending machine management system 1 according to the second embodiment, payment can be performed even at a position at which the user is away from the vending machine 20. Regarding this point, when a product is dispensed to the product dispensing port while the user is away from the vending machine 20, there is a possibility that a third party may erroneously take the product. However, with the vending machine management system 1 according to the second embodiment, the product is dispensed to the product dispensing port when the mobile terminal 10 is in proximity to the vending machine 20, and hence the occurrence of the inconvenience described above can be suppressed.

[2-3. Function Blocks]

Figure 12:
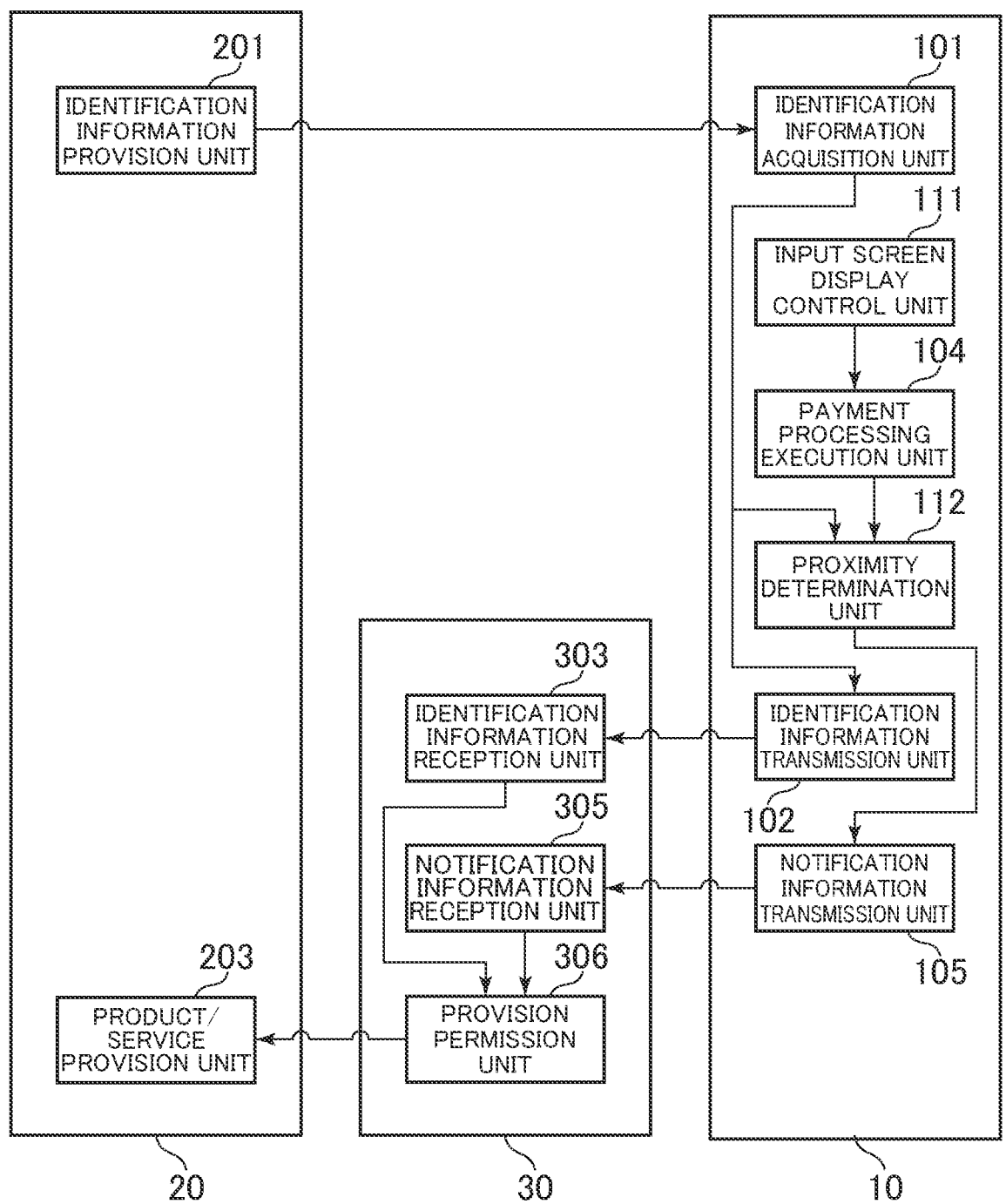
FIG. 12 is a function block diagram for illustrating an example of functions to be implemented by the vending machine management system according to the second embodiment.

FIG. 12 is a function block diagram for illustrating the function blocks to be implemented by the vending machine management system 1 according to the second embodiment.

As illustrated in FIG. 12, the mobile terminal 10 includes the identification information acquisition unit 101 (identification information acquisition means), the payment processing execution unit 104 (payment processing execution means), the notification information transmission unit 105, an input screen display control unit 111, and a proximity determination unit 112 (proximity determination means). Unlike the first embodiment, the mobile terminal 10 includes the input screen display control unit 111 and the proximity determination unit 112. Those units are mainly implemented by the control unit 11. The identification information acquisition unit 101 is the same as that of the first embodiment, and hence a description thereof is omitted here.

The vending machine 20 includes the identification information provision unit 201 (identification information provision means) and the product/service provision unit 203. The identification information provision unit 201 is the same as that of the first embodiment, and hence a description thereof is omitted here.

The management server 30 (management device) includes the identification information reception unit 303 (identification information reception means), the notification information reception unit 305 (notification information reception means), and the provision permission unit 306 (provision permission means). The identification information reception unit 303 is the same as that of the first embodiment, and hence a description thereof is omitted here.

Similarly to the first embodiment, in the second embodiment as well, the basic information table and the product-for-sale table shown in FIG. 5 and FIG. 6 are stored in the storage unit 22 of the vending machine 20, and the vending machine table shown in FIG. 7 is stored in the storage unit 32 of the management server 30.

[2-3-1] The input screen display control unit 111 displays on the display unit 16 a payment information input screen for receiving input of payment information. For example, the input screen display control unit 111 displays on the display unit 16 such a payment information input screen 50 for receiving input of a payment amount (example of payment information) as illustrated in FIG. 11.

[2-3-2] The payment processing execution unit 104 executes payment processing based on the payment information input via the payment information input screen. For example, when the payment button 53 of the payment information input screen 50 is selected, the payment processing execution unit 104 executes payment processing of the payment amount input in the form 52. For example, the payment processing execution unit 104 transmits a payment request to the payment server configured to execute payment. In this case, after user authentication processing and the like required to execute payment are executed, payment is executed at the payment server, and when payment is complete, the mobile terminal 10 is notified that payment is complete.

[2-3-3] The proximity determination unit 112 determines, based on a predetermined determination criterion, whether or not the mobile terminal 10 and the vending machine 20 identified based on the identification information acquired by the identification information acquisition unit 101 are in proximity to each other.

For example, the "determination criterion" is a determination criterion for determining whether or not the mobile terminal 10 and the vending machine 20 are in proximity to each other based on whether or not a reception strength of the beacon transmitted from the vending machine 20 at the mobile terminal 10 is equal to or more than a threshold value. More specifically, the proximity determination unit 112 determines whether or not the strength of the beacon received by the mobile terminal 10 (beacon reception unit 14) is equal to or more than a threshold value. When the strength is equal to or more than the threshold value, the proximity determination unit 112 determines that the mobile terminal 10 is in proximity to the vending machine 20. Meanwhile, when the strength is not equal to or more than the threshold value, the proximity determination unit 112 determines that the mobile terminal 10 is not in proximity to the vending machine 20.

The "determination criterion" may also be a determination criterion for determining whether or not the mobile terminal 10 and the vending machine 20 are in proximity to each other based on whether or not a distance between the mobile terminal 10 and the vending machine 20 is equal to or less than a threshold value. More specifically, the proximity determination unit 112 calculates the distance between the mobile terminal 10 and the vending machine 20 based on position information on the mobile terminal 10 acquired by the position measurement unit 18 and position information on the vending machine 20 acquired by the identification information acquisition unit 101, and determines whether or not the distance is equal to or less than a threshold value. When the distance is equal to or less than the threshold value, the proximity determination unit 112 determines that the mobile terminal 10 is in proximity to the vending machine 20. Meanwhile, when the distance is not equal to or less than the threshold value, the proximity determination unit 112 determines that the mobile terminal 10 is not in proximity to the vending machine 20.

The "determination criterion" may also be a determination criterion for determining whether or not the mobile terminal 10 and the vending machine 20 are in proximity to each other based on whether or not a code image (e.g., two-dimensional barcode) unique to the vending machine 20 attached to the outer surface of the housing of the vending machine 20 has been read (captured) by the mobile terminal 10. In this case, after the payment processing is complete, the user reads (captures) the code image by using a camera of the mobile terminal 10. The proximity determination unit 112 determines whether or not the read code image is the code image of the vending machine 20. For example, the proximity determination unit 112 determines whether or not the vending machine ID indicated by the read code image is the vending machine ID of the vending machine 20. When the read code image is the code image of the vending machine 20, the proximity determination unit 112 determines that the mobile terminal 10 is in proximity to the vending machine 20. When the vending machine 20 includes a display unit, the code image may be displayed on the display unit.

[2-3-4] The notification information transmission unit 105 transmits predetermined notification information to the management server 30 via the communication unit 13 when the payment processing is complete and it is determined that the mobile terminal 10 and the vending machine 20 are in proximity to each other.

For example, the notification information transmission unit 105 transmits to the management server 30 completion notification information indicating that payment processing is complete. Specifically, when payment processing related to a payment amount of "130 yen" is complete and it is determined that the mobile terminal 10 and the vending machine 20 are in proximity to each other, the notification information transmission unit 105 transmits to the management server 30 completion notification information including a payment amount of "130 yen". As described later, when such notification information as that described above is transmitted to the management server 30, the management server 30 (provision permission unit 306) permits the vending machine 20 to provide the product. Therefore, the notification information transmitted by the notification information transmission unit 105 can be said to be an instruction to the management server 30 to permit the vending machine 20 to provide the product.

[2-3-5] When the notification information is received by the notification information reception unit 305, the provision permission unit 306 permits the vending machine 20 to provide a product or a service.

For example, when completion notification information including a payment amount of "130 yen" is received, the provision permission unit 306 transmits to the vending machine 20 permission notification information indicating that provision of a product of 130 yen or less is permitted. When it is determined that the mobile terminal 10 and the vending machine 20 are in proximity to each other, the notification information transmission unit 105 transmits completion notification information to the management server 30. As a result, when the notification information is received by the notification information reception unit 305, and it is determined that the mobile terminal 10 and the vending machine 20 are in proximity to each other, the provision permission unit 306 transmits permission notification information to the vending machine 20.

When permission notification information indicating permission for provision of a product of 130 yen or less is received by the vending machine 20, the vending machine 20 is in the same state as when 130 yen has been inserted into the coin insertion slot of the vending machine. When a product of 130 yen or less is selected by the user as a desired product, the product/service provision unit 203 dispenses the product to the product dispensing port.

Figure 13:
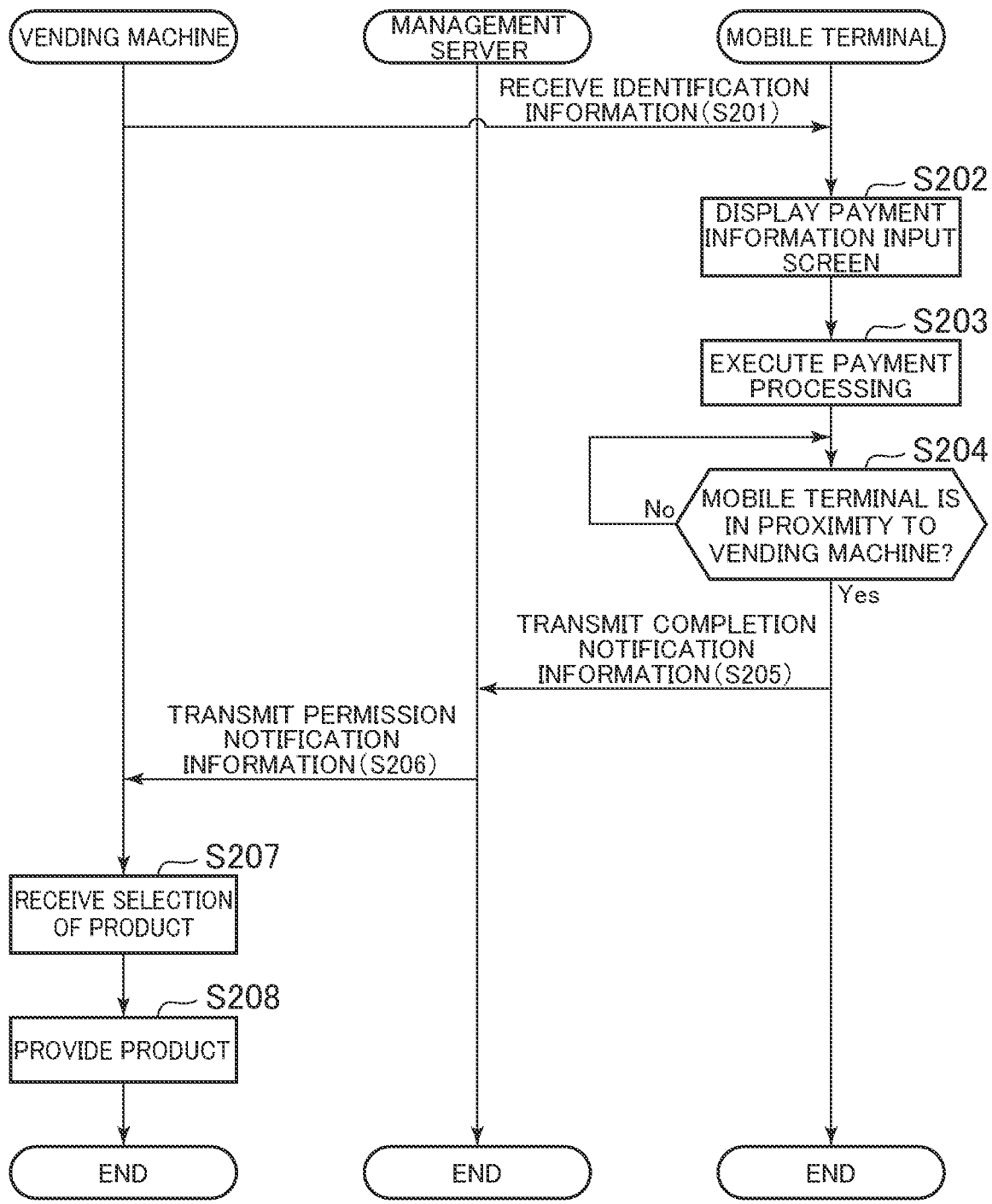
FIG. 13 is a flowchart for illustrating an example of processing to be executed by the vending machine management system according to the second embodiment.

[2-4. Processing] FIG. 13 is a flowchart for illustrating an example of processing to be executed by the vending machine management system. 1 according to the second embodiment. Through execution of the processing illustrated in FIG. 13 in accordance with programs stored in the storage units 12, 22, and 32, respectively, the control units 11, 21, and 31 function as the function blocks (excluding identification information provision unit 201) illustrated in FIG. 12.

As described above, the beacon transmission unit 24 of the vending machine 20 transmits the identification information (vending machine ID and position information) on the vending machine 20 by a beacon, and the mobile terminal 10 receives the identification information (Step S201).

When the identification information on the vending machine 20 is received at the mobile terminal 10, the control unit 11 displays the payment information input screen 50 on the display unit 16 (Step S202). When the payment button 53 of the payment information input screen 50 is selected, the control unit 11 executes payment processing based on a payment amount input to the form 52 (Step S203). For example, the control unit 11 transmits a payment request for the payment amount to the payment server configured to execute payment. Then, when the payment server notifies the mobile terminal 10 that payment is complete, the control unit 11 determines that the payment processing is complete.

After the execution of Step S203, the control unit 11 determines whether or not the mobile terminal 10 is in proximity to the vending machine 20 (Step S204).

For example, the control unit 11 determines whether or not the reception strength of the beacon received in Step S201 is equal to or more than a threshold value. When the reception strength is equal to or more than the threshold value, the control unit 11 determines that the mobile terminal 10 is in proximity to the vending machine 20.

The control unit 11 may also calculate the distance between the mobile terminal 10 and the vending machine 20 based on the position information on the mobile terminal 10 acquired by the position measurement unit 18 and the position information on the vending machine 20 received in Step S201, and determine whether or not the distance is equal to or less than a threshold value. When the distance is equal to or less than the threshold value, the control unit 11 may determine that the mobile terminal 10 is in proximity to the vending machine 20.

When it is determined that the mobile terminal 10 is in proximity to the vending machine 20, the control unit 11 transmits to the management server 30 completion notification information indicating that the payment processing is complete (Step S205). For example, when the payment processing executed in Step S203 is payment processing related to a payment amount of "130 yen" (i.e., when the payment amount input to the form. 52 of the payment information input screen 50 is "130 yen"), the control unit 11 transmits a payment amount of "130 yen" as the completion notification information to the management server 30. In this case, the vending machine ID received in Step S201 is also transmitted to the management server 30.

When the completion notification information is received by the management server 30, the control unit 31 transmits to the vending machine 20 permission notification information indicating permission to provide a product within the payment amount range (Step S206). For example, the control unit 31 refers to the vending machine table to readout the communication address information associated with the vending machine ID received together with the completion notification information in Step S205. The control unit 31 also transmits permission notification information to a destination corresponding to the communication address information. For example, when a payment amount of "130 yen" is received as the completion notification information, the payment amount of "130 yen" is transmitted as the permission notification information.

When the permission notification information is received by the vending machine 20, the control unit 21 receives the selection of a product based on the permission notification information (Step S207). For example, when the payment amount of "130 yen" is received as the permission notification information, the control unit 21 sets the state of the vending machine 20 to the same state as when 130 yen is inserted into the coin insertion slot of the vending machine 20, and receives selection of a product of 130 yen or less. When a button corresponding to a product of 130 yen or less is pressed, the control unit 21 dispenses the product corresponding to that button to the product dispensing port to provide the product to the user (Step S208).

[2-5. Summary]

Similarly to the first embodiment, even with the vending machine management system 1 according to the second embodiment, the user can purchase a product sold by the vending machine 20 with payment means other than cash by using the mobile terminal 10. Further, the above-mentioned functions can be implemented while suppressing the costs of the hardware to be added to each vending machine 20.

With the vending machine management system 1 according to the second embodiment, it is presumed that payment is performed (payment information is input) at a position at which the user is away from the vending machine 20. When a product is dispensed to the product dispensing port while the user is away from the vending machine 20, there is a possibility that a third party may erroneously take the product. Regarding this point, with the vending machine management system 1 according to the second embodiment, the product is dispensed to the product dispensing port when the mobile terminal 10 is in proximity to the vending machine 20, and hence the occurrence of the inconvenience described above can be suppressed.

With the vending machine management system 1 according to the second embodiment, a beacon to be used for another purpose can instead be used to determine whether or not the mobile terminal 10 is in proximity to the vending machine 20.

3. Third Embodiment

Next, a third embodiment of the present invention is described.

[3-1. System Configuration]

A vending machine management system 1 according to the third embodiment has the same configuration as that of the first embodiment (see FIG. 1).

[3-2. Outline of Functions]

Figure 14:
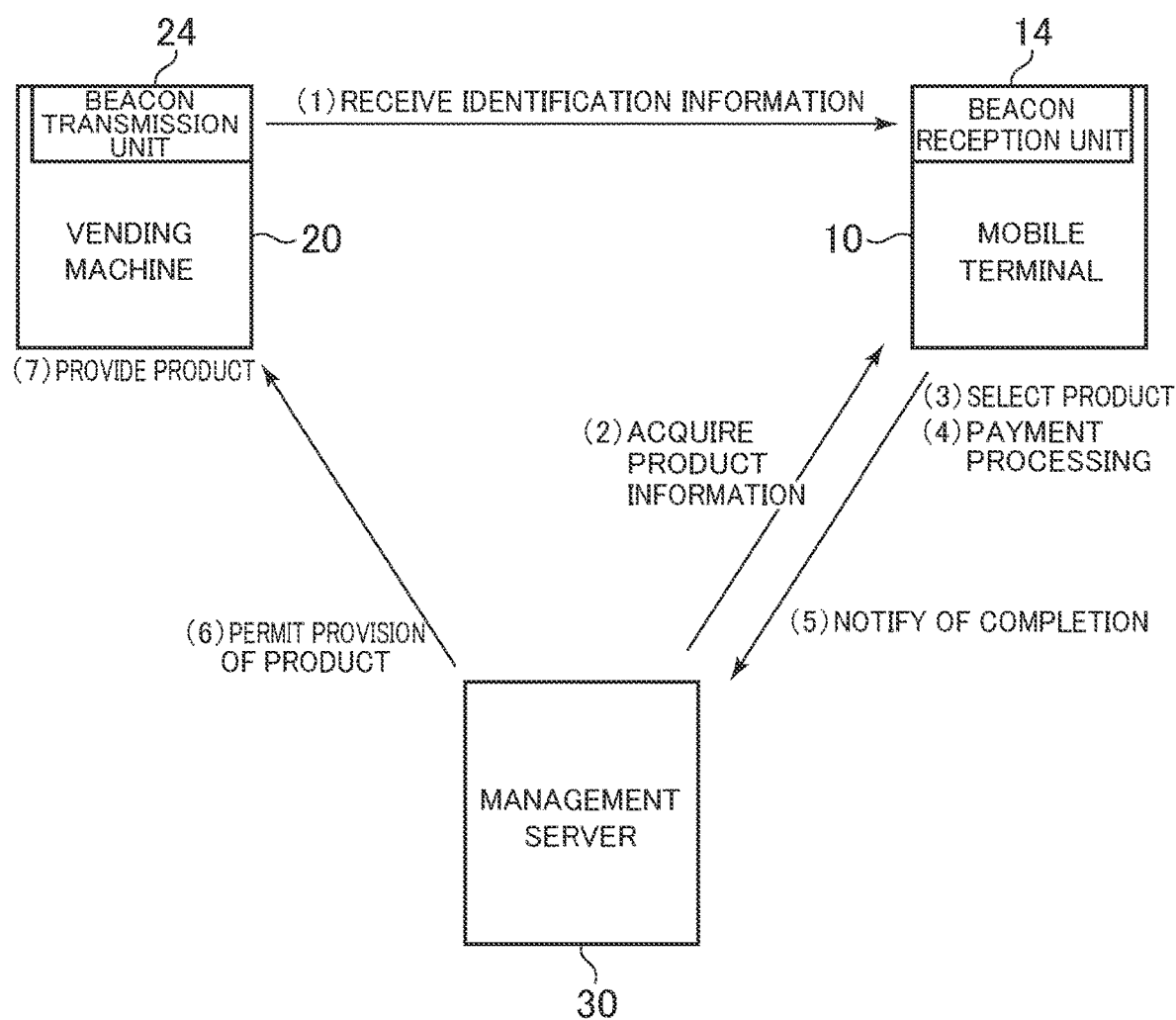
FIG. 14 is a diagram for illustrating an example of a flow until the user obtains a product in the vending machine management system according to the third embodiment.

In the first and second embodiments, the product to be purchased is selected at the vending machine 20, but in the third embodiment, the product to be purchased is selected on the mobile terminal 10. FIG. 14 is a diagram for illustrating a flow until the user obtains a product in the third embodiment.

(1) Similarly to the first and second embodiments, the beacon transmission unit 24 of the vending machine 20 transmits a beacon indicating identification information (e.g., vending machine ID and position information) on the vending machine 20 every predetermined time period. The beacon is received by the beacon reception unit 14 of the mobile terminal 10, which is in the vicinity of the vending machine 20.

(2) When the identification information on the vending machine 20 is received by the mobile terminal 10, the mobile terminal 10 acquires information on the products sold by the vending machine 20 from the management server 30 via the network 2. Specifically, when the mobile terminal 10 transmits a vending machine ID to the management server 30, a list of the products sold by the vending machine 20 having that vending machine ID is transmitted back from the management server 30 to the mobile terminal 10.

Figure 15:
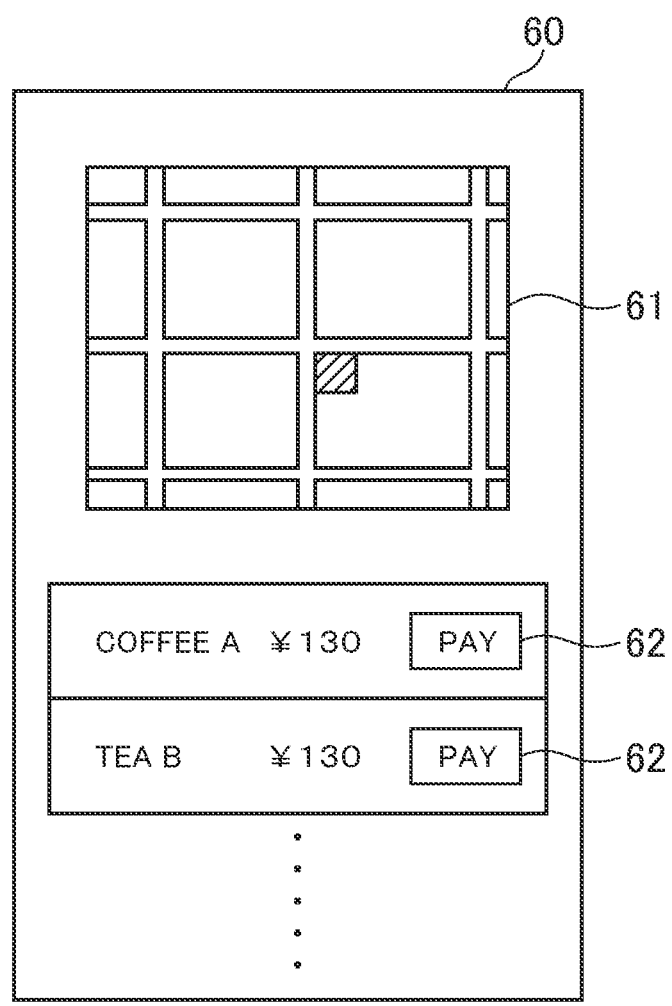
FIG. 15 is a diagram for illustrating an example of a product selection screen.

(3) (4) When the information on the products sold by the vending machine 20 is received by the mobile terminal 10, the mobile terminal 10 displays a product selection screen on the display unit 16. FIG. 15 is a diagram for illustrating an example of a product selection screen. As illustrated in FIG. 15, the position information on the vending machine 20 is displayed on the product selection screen 60. Specifically, a map 61 indicating the position of the vending machine 20 is displayed on the product selection screen 60. A list of the products sold by the vending machine 20 is also displayed on the product selection screen 60. Payment buttons 62 are also displayed in association with each product included in the list. The user selects the product to be purchased by selecting the payment button 62 associated with the desired product. When any one of the payment buttons 62 is selected, payment processing of the product associated with the selected payment button 62 is executed. In this payment processing, payment using payment means other than cash (e.g., credit card, electronic money, or points) is executed. For example, the mobile terminal 10 transmits a payment request to the payment server configured to execute payment. In this case, payment is executed by the payment server, and when payment is complete, the mobile terminal 10 is notified that payment is complete.

(5) When the mobile terminal 10 is located in the vicinity of the vending machine 20 when the payment processing is complete, the mobile terminal 10 transmits to the management server 30 via the network 2 completion notification information indicating that the payment processing is complete.

(6) When the completion notification information is received by the management server 30, the management server 30 transmits to the vending machine 20 via the network 2 permission notification information indicating that provision of the product to be purchased, which is selected on the product selection screen 60, is permitted.

(7) When the permission notification information is received by the vending machine 20, the vending machine 20 provides the product to be purchased. Specifically, the vending machine 20 dispenses the product to the product dispensing port.

The user can obtain the product to be purchased in the manner described above. Even with the vending machine management system 1 according to the third embodiment, the user can purchase a product sold by the vending machine 20 with payment means other than cash by using the mobile terminal 10. The above-mentioned functions can be implemented while suppressing the costs of the hardware to be added to each vending machine 20. Further, similarly to the second embodiment, even with the vending machine management system 1 according to the third embodiment, the occurrence of the inconvenience that a third party erroneously takes the product can be suppressed.

[3-3. Function Blocks]

Figure 16:
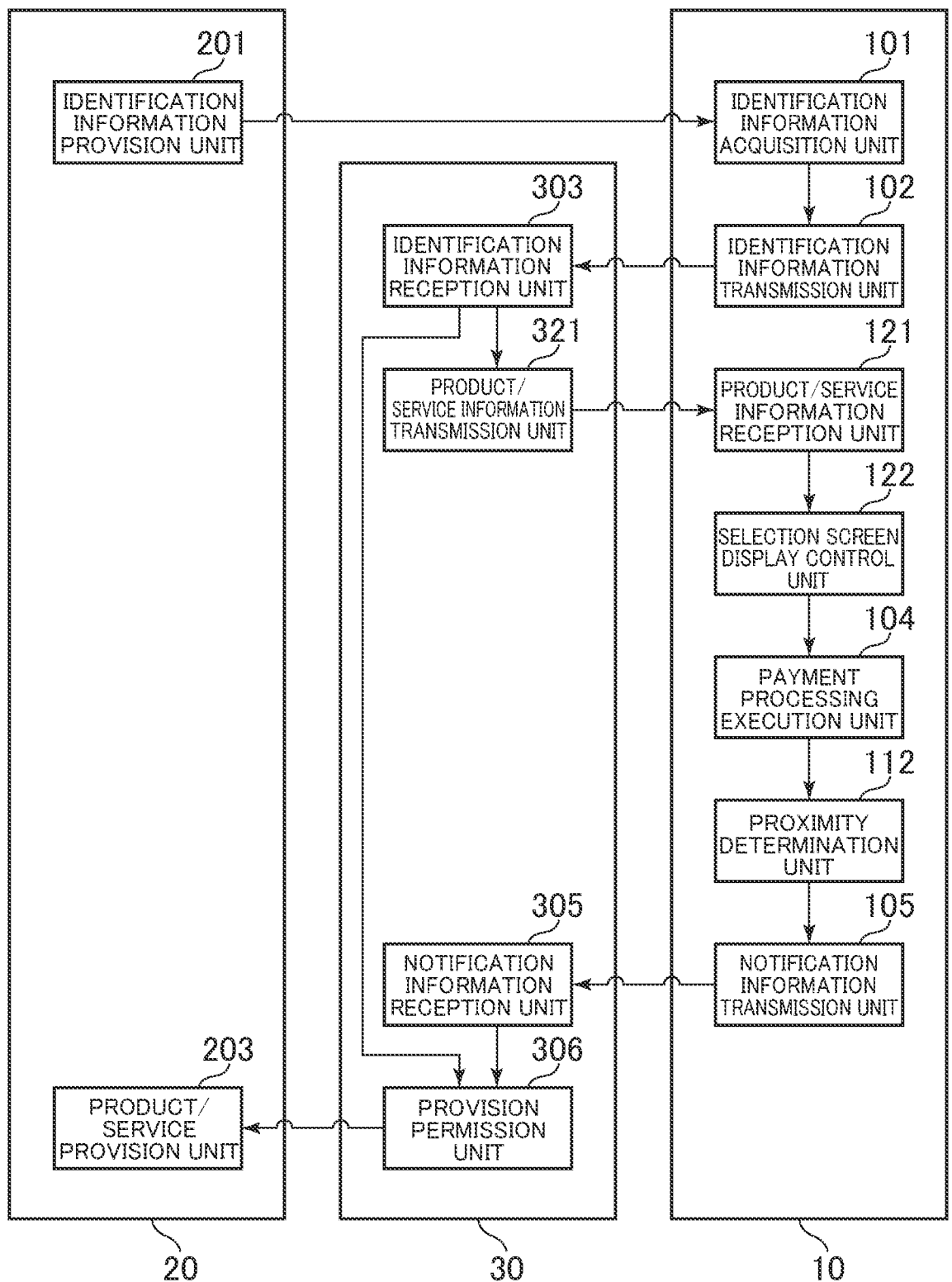
FIG. 16 is a function block diagram for illustrating an example of functions to be implemented by the vending machine management system according to the third embodiment.

FIG. 16 is a function block diagram for illustrating the function blocks to be implemented by the vending machine management system 1 according to the third embodiment.

As illustrated in FIG. 16, the mobile terminal 10 includes the identification information acquisition unit 101 (identification information acquisition means), the identification information transmission unit 102, the payment processing execution unit 104 (payment processing execution means), the notification information transmission unit 105, the proximity determination unit 112 (proximity determination means), a product/service information reception unit 121 (product/service information acquisition means), and a selection screen display control unit 122 (selection screen display control means). Unlike the first and second embodiments, the mobile terminal 10 includes the product/service information reception unit 121 and the selection screen display control unit 122. Those units are mainly implemented by the control unit 11. The identification information acquisition unit 101 and the identification information transmission unit 102 are the same as in the first embodiment, and the proximity determination unit 112 is the same as in the second embodiment, and thus a description thereof is omitted here.

The vending machine 20 includes the identification information provision unit 201 (identification information provision means) and the product/service provision unit 203. The identification information provision unit 201 is the same as that of the first embodiment, and hence a description thereof is omitted here.

The management server 30 (management device) includes the identification information reception unit 303 (identification information reception means), the notification information reception unit 305 (notification information reception means), the provision permission unit 306 (provision permission means), and a product/service information transmission unit 321. Unlike the first and second embodiments, the management server 30 includes the product/service information transmission unit 321. This unit is mainly implemented by the control unit 31. The identification information reception unit 303 is the same as that of the first embodiment, and hence a description thereof is omitted here.

[3-3-1] Before the above-mentioned function blocks are described, information stored in advance in the vending machine 20 and the management server 30 is described.

Similarly to the first embodiment, in the third embodiment as well, the basic information table and the product-for-sale table shown in FIG. 5 and FIG. 6 are stored in advance in the storage unit 22 of the vending machine 20, and the vending machine table shown in FIG. 7 is stored in advance in the storage unit 32 of the management server 30.

Meanwhile, unlike the first embodiment, in the storage unit 32 of the management server 30, as shown in FIG. 17, a product-for-sale table is stored for each vending machine 20 stored in association with vending machine ID. The product-for-sale tables shown in FIG. 17 are the same as the product-for-sale table stored in the storage unit 22 of each vending machine 20. Specifically, in the third embodiment, the product-for-sale table stored in the storage unit 22 of each vending machine 20 is stored centrally also in the storage unit 32 of the management server 30. The product-for-sale tables shown in FIG. 17 may also be stored on another storage device accessible from the management server 30.

[3-3-2] The product/service information transmission unit 321 transmits information on the product or the services sold by the vending machine 20 identified based on the identification information received by the identification information reception unit 303 to the mobile terminal 10 via the communication unit 33. The product/service information reception unit 121 receives and acquires the information via the communication unit 13.

For example, the product/service information transmission unit 321 refers to the product-for-sale table stored in association with the vending machine ID received by the identification information reception unit 303, and transmits a list of the products registered in the product-for-sale table to the mobile terminal 10. The product/service information reception unit 121 receives the list.

[3-3-3] The selection screen display control unit 122 displays on the display unit 16 a selection screen for selecting, as a purchase target, at least one product or service sold by the vending machine 20 identified based on the identification information received by the identification information reception unit 303. The selection screen is displayed based on the information received by the product/service information reception unit 121.

For example, the selection screen display control unit 122 displays on the display unit 16 such a product selection screen 60 as illustrated in FIG. 15.

[3-3-4] The payment processing execution unit 104 executes payment processing for receiving provision of the product or the service selected as the purchase target.

For example, when any one of the payment buttons 62 of the product selection screen 60 is selected, the payment processing execution unit 104 executes payment processing related to the product corresponding to the selected payment button 62. For example, the payment processing execution unit 104 transmits a payment request to the payment server configured to execute payment. In this case, after user authentication processing and the like required to execute payment are executed, payment is executed at the payment server, and when payment is complete, the mobile terminal 10 is notified that payment is complete.

[3-3-5] The notification information transmission unit 105 transmits predetermined notification information to the management server 30 via the communication unit 13 when payment processing is complete and it is determined that the mobile terminal 10 and the vending machine 20 are in proximity to each other.

For example, the notification information transmission unit 105 transmits to the management server 30 completion notification information indicating that the payment processing is complete. In this example, it is assumed that the product having the product ID "P1" is selected as a product to be purchased. In this case, the notification information transmission unit 105 transmits to the management server 30 completion notification information including the product ID "P1". Similarly to the second embodiment, when such notification information as described above is transmitted to the management server 30, the management server 30 (provision permission unit 306) permits the vending machine 20 to provide the product. Therefore, the notification information transmitted by the notification information transmission unit 105 can be said to be an instruction to the management server 30 to permit the vending machine 20 to provide the product.

[3-3-5] The provision permission unit 306 permits, when the notification information is received by the notification information reception unit 305, the vending machine 20 identified based on the identification information received by the identification information reception unit 303 to provide a product or a service. The product/service provision unit 203 provides the product or the service in accordance with the permission by the provision permission unit 306.

For example, when the completion notification information including the product ID "P1" is received, the provision permission unit 306 transmits to the vending machine 20 permission notification information indicating permission to provide the product having the product ID "P1". When it is determined that the mobile terminal 10 and the vending machine 20 are in proximity to each other, the notification information transmission unit 105 transmits completion notification information to the management server 30.

Therefore, when the notification information is received by the notification information reception unit 305 and it is determined that the mobile terminal 10 and the vending machine 20 are in proximity to each other, the provision permission unit 306 transmits the permission notification information to the vending machine 20.

When the permission notification information indicating that provision of the product having the product ID "P1" is permitted is received by the vending machine 20, the product/service provision unit 203 dispenses the product having the product ID "P1" to the product dispensing port.

[3-4. Processing]

Figure 18:
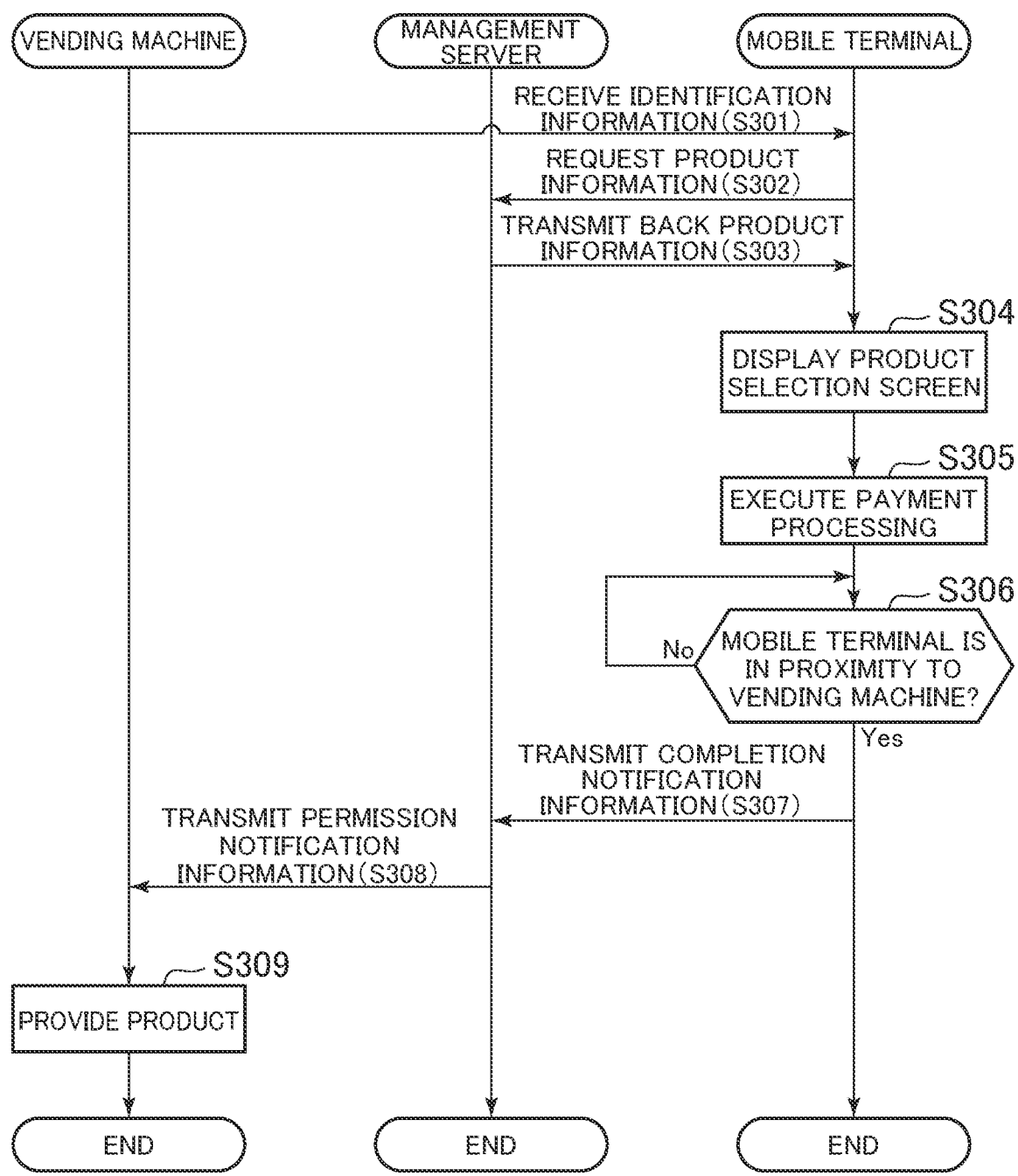
FIG. 18 is a flowchart for illustrating an example of processing to be executed by the vending machine management system according to the third embodiment.

FIG. 18 is a flowchart for illustrating an example of processing to be executed by the vending machine management system 1 according to the third embodiment. Through execution of the processing illustrated in FIG. 18 in accordance with programs stored in the storage units 12, 22, and 32, respectively, the control units 11, 21, and 31 function as the function blocks (excluding identification information provision unit 201) illustrated in FIG. 16.

As described above, the beacon transmission unit 24 of the vending machine 20 transmits the identification information (vending machine ID and position information) on the vending machine 20 by a beacon, and the mobile terminal 10 receives the identification information (Step S301).

When the identification information on the vending machine 20 is received by the mobile terminal 10, the control unit 11 acquires information on the products sold by the vending machine 20 from the management server 30 based on the identification information. Specifically, the control unit 11 requests the management server 30 for the information on the products sold by the vending machine 20 by transmitting the vending machine ID back to the management server 30 (Step S302). In this case, the control unit 31 of the management server 30 transmits the information to the mobile terminal 10 (Step S303). More specifically, the control unit 31 refers to the product-for-sale table stored in association with the vending machine ID transmitted from the mobile terminal 10 to read out the list of the products registered in the product-for-sale table, and transmits the read list back to the mobile terminal 10.

After the execution of Step S303, the control unit 11 displays the product selection screen 60 on the display unit 16 based on the information received in Step S303 (Step S304). When any one of the payment buttons 62 of the product selection screen is selected, the control unit 11 identifies the product corresponding to the selected payment button 62 as the product to be purchased, and based on the information (price) on the product to be purchased, executes the payment processing related to the product to be purchased (Step S305). For example, the control unit 11 transmits a payment request to the payment server configured to execute payment. When the mobile terminal 10 is notified from the payment server that payment is complete, the control unit 11 determines that the payment processing is complete.

After the execution of Step S305, the control unit 11 determines whether or not the mobile terminal 10 is in proximity to the vending machine 20 (Step S306). Step S306 is the same as Step S204 of FIG. 13.

When it is determined that the mobile terminal 10 is in proximity to the vending machine 20, the control unit 11 transmits to the management server 30 completion notification information indicating that the payment processing is complete (Step S307). For example, when the product ID of the product to be purchased is "P1", the control unit 11 transmits to the management server 30 the product ID "P1" as the completion notification information. In this case, the vending machine ID received in Step S301 is also transmitted to the management server 30.

When the completion notification information is received by the management server 30, the control unit 31 transmits to the vending machine 20 permission notification information indicating that provision of the product to be purchased is permitted (Step S308). For example, the control unit 31 refers to the vending machine table to readout the communication address information associated with the vending machine ID received together with the completion notification information in Step S306. Then, the control unit 31 transmits the permission notification information to a destination corresponding to the communication address information. When the product ID "P1" is received as the completion notification information, the product ID "P1" is transmitted as the permission notification information.

When the permission notification information is received by the vending machine 20, the control unit 21 provides the product to be purchased based on that permission notification information (Step S309). For example, when the product ID "P1" is received as the permission notification information, the control unit 31 refers to the product-for-sale table and dispenses the product having the product ID "P1" to the product dispensing port.

[3-5. Summary]

Even with the vending machine management system 1 according to the third embodiment, the user can purchase a product sold by the vending machine 20 with payment means other than cash by using the mobile terminal 10. The above-mentioned functions can be implemented while suppressing the costs of the hardware to be added to each vending machine 20.

With the vending machine management system 1 according to the third embodiment, even at a position away from the vending machine 20, the user can use the mobile terminal 10 to perform a procedure for purchasing the product sold by the vending machine 20. With the vending machine management system 1 according to the third embodiment, it is also possible not to provide a sample window on the vending machine 20.

Even with the vending machine management system 1 according to the third embodiment, payment can be performed (product to be purchased can be selected) even at a position at which the user is away from the vending machine 20. When a product is dispensed to the product dispensing port while the user is away from the vending machine 20, there is a possibility that a third party may erroneously take the product. Regarding this point, with the vending machine management system 1 according to the third embodiment, the product is dispensed to the product dispensing port when the mobile terminal 10 is in proximity to the vending machine 20, and hence the occurrence of the inconvenience described above can be suppressed.

4. Modification Examples

The present invention is not limited to the first to third embodiments described above.

Figure 19:
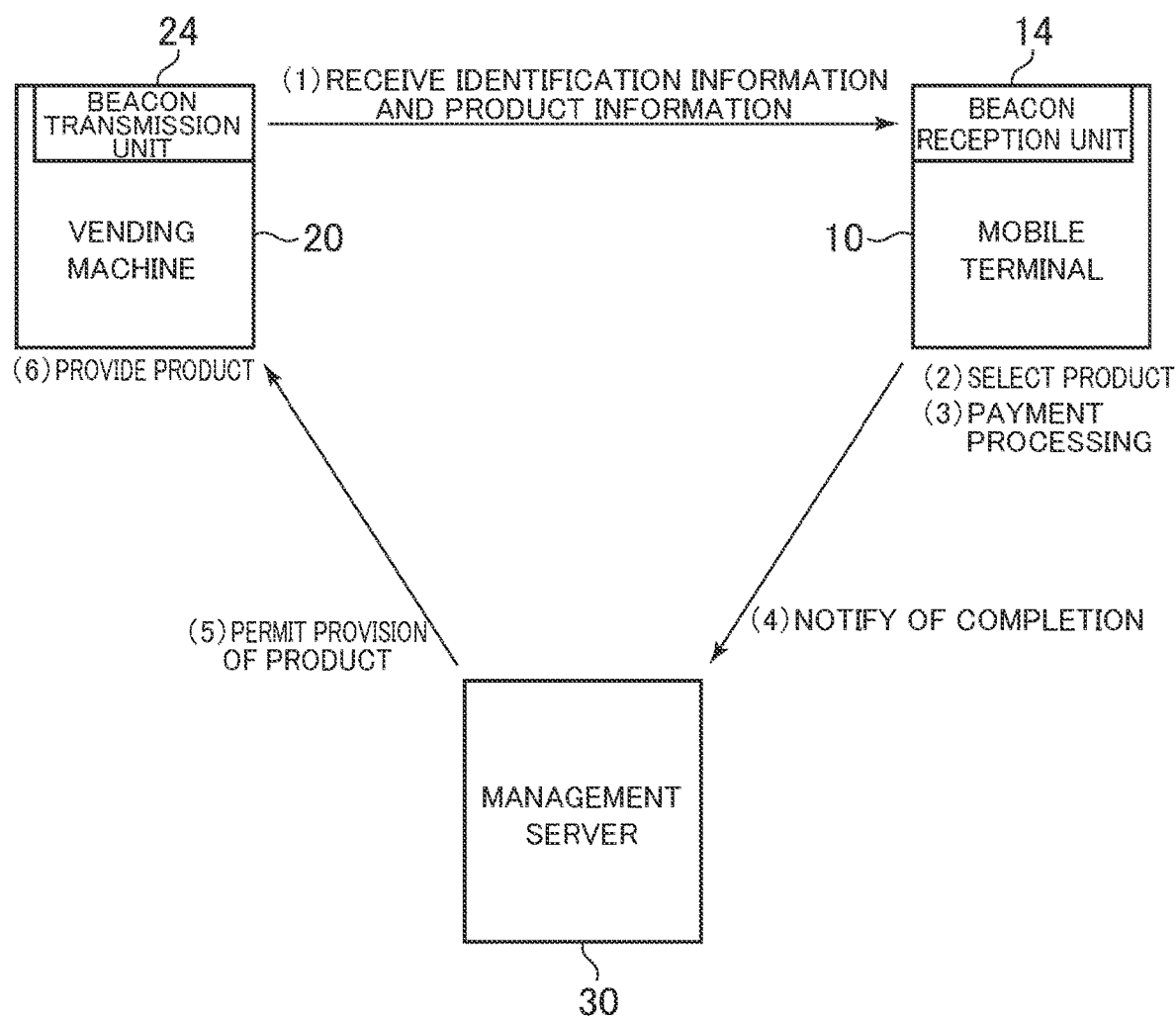
FIG. 19 is a diagram for illustrating another example of a flow until the user obtains a product in the vending machine management system according to the third embodiment.

[4-1] In the third embodiment, as illustrated in FIG. 19, the beacon transmission unit 24 may be configured to use a beacon to transmit the identification information on the vending machine 20 and the information (e.g., product ID, name, or price) of the products sold by the vending machine 20. The mobile terminal 10 may be configured to acquire the information on the products sold by the vending machine 20 from the beacon received by the beacon reception unit 14 in place of acquiring that information from the management server 30.

[4-2] In the second and third embodiments, the transmission of the notification information by the notification information transmission unit 105 is not restricted based on the determination result of the proximity determination unit 112, but execution of the payment processing by the payment processing execution unit 104 may be controlled based on the determination result of the proximity determination unit 112. More specifically, when the mobile terminal 10 and the vending machine 20 are not in proximity to each other, purchase processing may be prevented from being executed by not displaying the payment buttons 53 and 62, by displaying the payment buttons 53 and 62 in a non-selectable state, or by displaying an error message or the like even when the payment buttons 53 and 62 are selected.

[4-3] In the second and third embodiments, the proximity determination unit 112 may be implemented by the management server 30.

In this modification example, the information (e.g., reception strength information on beacon at mobile terminal 10 or position information on mobile terminal 10) required for determination by the proximity determination unit 112 is supplied to the management server 30, and the determination is executed by the proximity determination unit 112.

In this modification example, the permission by the provision permission unit 306 is restricted based on the determination result of the proximity determination unit 112. In other words, even when completion notification information is received by the notification information reception unit 305, the provision permission unit 306 does not transmit the permission notification information to the vending machine 20 unless it is determined by the proximity determination unit 112 that the mobile terminal 10 and the vending machine 20 are in proximity to each other. More specifically, the provision permission unit 306 transmits the permission notification information to the vending machine 20 when completion notification information is received by the notification information reception unit 305 and it is determined by the proximity determination unit 112 that the mobile terminal 10 and the vending machine 20 are in proximity to each other.

[4-4] In the second and third embodiments, there is presumed a case in which each of a plurality of users who are in range of a beacon from the same vending machine 20 (beacon transmission unit 24) performs payment by using his or her mobile terminal 10, and the plurality of users come to receive provision of the product (or service) from the vending machine 20 at the same time. In order to accurately provide the product (or service) to each user even in such a case, the following may be performed.

[4-4-1] First, the product (or service) may be provided by the vending machine 20 in order of users of the mobile terminal 10 determined to be in proximity to the vending machine 20 first.

For example, in a mode of determining whether or not the mobile terminal 10 is in proximity to the vending machine 20 by determining whether or not a reception strength of the beacon at the mobile terminal 10 is equal to or more than a threshold value, the product (or service) may be provided by the vending machine 20 in order of users of the mobile terminal 10 for which the reception strength of the beacon has first become equal to or more than the threshold value.

As another example, in a mode of determining whether or not the mobile 10 is in proximity to the vending machine 20 by determining whether or not the distance between the mobile terminal 10 and the vending machine 20 has become equal to or less than a threshold value, the product (or service) may be provided by the vending machine 20 in order of users of the mobile terminal 10 for which the distance to the vending machine 20 has first become equal to or less than a threshold value.

As yet another example, in a mode of determining whether or not the mobile 10 is in proximity to the vending machine 20 by determining whether or not a code image read by the mobile terminal 10 is the code image of the vending machine 20, the product (or service) may be provided by the vending machine 20 in order of users of the mobile terminal 10 determined as having a code image that is the code image of the vending machine 20 first.

[4-4-2] When a product is dispensed to the product dispensing port, information enabling identification of a user who purchased the product may be displayed on the display unit of the vending machine 20. For example, a code (e.g., reservation number) may be generated when the payment processing is complete, the user may be notified of the code, and the code may be displayed on the display unit of the vending machine 20 when the product to be purchased is dispensed to the product dispensing port. In this way, through comparing the code notified to the user with the code displayed on the display unit of the vending machine 20, the user can grasp whether or not the product dispensed to the product dispensing port is the product purchased by himself or herself.

[4-4-3] The vending machine 20 may include a dedicated button for receiving provision of the product (or service) paid for by using the mobile terminal 10. For example, when the dedicated button is pressed by the user and a predetermined operation is also performed by the user on the mobile terminal 10 (e.g., predetermined button displayed on screen is pressed), provision of the product or the service may be performed by transmitting to the vending machine 20 a code (e.g., reservation number) stored in the mobile terminal 10 when payment processing is complete.

[4-4-4] For example, when payment processing is performed by using any one of the mobile terminals 10, the management server 30 may notify the vending machine 20 that the payment processing has been performed, and the range of the beacon transmitted by the beacon transmission unit 24 may be temporarily set to a narrower range (e.g., 1 m) than a normal range (e.g., 10 m). When provision of the product (or service) is complete, the temporarily-set range may be returned to the normal range (e.g., 10 m).

Through setting the range in this way, it is more difficult for a plurality of users within the range of a beacon transmitted from the same vending machine 20 to perform payment at the same time. As a result, there is a reduced likelihood of a situation occurring in which a plurality of users within the range of a beacon transmitted from the same vending machine 20 each perform payment by using his or her mobile terminal 10, and the plurality of users come to receive provision of the product (or service) from the vending machine 20 at the same time.

[4-5] In the third embodiment, when there is no stock of a product X among the products provided by the vending machine 20, another vending machine 20 having a stock of the product X may be presented to the user.

For example, the mobile terminal 10 may transmit the position information on the mobile terminal 10 acquired by the position measurement unit 18 to the management server 30, and the management server 30 may identify, based on the position information on the mobile terminal 10, the vending machine table, and the product-for-sale table, another vending machine 20 that is within a predetermined distance from the mobile terminal 10 and that has a stock of the product X, and display on a screen information on that vending machine 20. The management server 30 may also transmit the vending machine table and the product-for-sale table stored in the storage unit 32 to the mobile terminal 10, and the mobile terminal 10 may identify, based on the position information on the mobile terminal 10, the vending machine table, and the product-for-sale table, another vending machine 20 that is within a predetermined distance from the mobile terminal 10 and that has a stock of the product X, and display on a screen information on the vending machine 20.

[4-6] In the first to third embodiments, the identification information (vending machine ID and position information) on the vending machine 20 is provided by the beacon transmission unit 24, but in place of including the beacon transmission unit 24, a code image (e.g., two-dimensional bar code) indicating the identification information on the vending machine 20 may be attached to the outer surface of the housing of the vending machine 20. As another example, when the vending machine 20 includes a display unit, the code image may be displayed on the display unit. In this case, the code image attached to the outer surface of the casing of the vending machine 20, or the display unit displaying the code image, correspond to the identification information provision unit 201. Further, in this case, the mobile terminal 10 (identification information acquisition unit 101) captures the code image with the camera of the mobile terminal 10 to acquire the identification information on the vending machine 20 from the captured code image. The code image can be comparatively easily sequentially added to the vending machine 20 in the same manner as the beacon transmission unit 24.

[4-7] In the second and third embodiments, when the beacon transmitted from a vending machine 20 (beacon transmission unit 24) is received by the mobile terminal 10 (beacon reception unit 14), the vending machine 20 becomes a transaction target, and the payment information input screen 50 and the product selection screen 60 are displayed on the display unit 16.

However, when the beacon transmitted from a vending machine 20 is received by the mobile terminal 10, and the distance between the vending machine 20 and the mobile terminal 10 (distance between position information on mobile terminal 10 acquired by position measurement unit 18 and position information on vending machine 20 acquired by identification information acquisition unit 101) is equal to less than a threshold value, the vending machine 20 may become the transaction target, and the payment information input screen 50 and the product selection screen 60 may be displayed on the display unit 16. In other words, even when a beacon transmitted from a vending machine 20 is received by the mobile terminal 10, the vending machine 20 does not become the transaction target unless the distance between the vending machine 20 and the mobile terminal 10 is equal to or less than a threshold value.

The user may also designate a desired product (or service), and when a beacon transmitted from a vending machine 20 is received by the mobile terminal 10 and the vending machine 20 provides the product (or service) desired by the user, the vending machine 20 may become the transaction target, and the payment information input screen 50 or the product selection screen 60 may be displayed on the display unit 16. In other words, even when a beacon transmitted from a vending machine 20 is received by the mobile terminal 10, the vending machine 20 does not become the transaction target unless the vending machine 20 provides the product (or service) desired by the user.

A vending machine 20 within range of a predetermined distance from the mobile terminal 10 may be set as the transaction target, and the payment information input screen 50 and the product selection screen 60 may be displayed on the display unit 16. In this case, the vending machine 20 within range of a predetermined distance from the mobile terminal 10 may be identified by the management server 30. Specifically, the position information on the mobile terminal 10 acquired by the position measurement unit 18 may be transmitted to the management server 30, and the management server 30 (control unit 31) may identify a vending machine 20 within range of a predetermined distance from the mobile terminal 10 based on the position information on the mobile terminal 10 and the vending machine table. The vending machine table stored in the storage unit 32 of the management server 30 may also be transmitted to the mobile terminal 10, and the mobile terminal 10 (control unit 11) may identify a vending machine 20 within range of a predetermined distance from the mobile terminal 10 based on the position information on the mobile terminal 10 and the vending machine table.

[4-8] In the first embodiment, after selection of the product, when the user has not performed payment by a predetermined time (when payment processing has not been executed by a predetermined time), the selection of the product may be canceled (of the payment information stored in the management server 30, the payment information on the product may be canceled). In this case, the user having canceled product selection is required to start the procedure for purchasing products from the beginning.

In the second and third embodiments, after the payment processing is complete, when the user has not come to receive the product from the vending machine 20 by a predetermined time (when it is not determined by a predetermined time that the mobile terminal 10 is in proximity to the vending machine 20), the payment may be canceled and refund processing may be executed. Through performing such processing, after payment, when the user is unable to come to receive the product for some reason, the payment is canceled, and a situation can be avoided in which a product is not obtained even though the user has paid for the product. Further, through performing such processing, the order can be canceled when the user does not come to receive the product after payment, which allows an undue reduction in the stock of the product to be prevented. As a result, it is possible to suppress narrowing of product options for other users due to users who have not come to pick up their product after payment.

In the first to third embodiments, when the product is dispensed to the product dispensing port, the vending machine 20 (control unit 21) may transmit to the management server 30 normal completion notification information indicating that provision of the product has been successfully completed. When the normal completion notification information is not received within a predetermined time period, the management server 30 may also determine that a timeout has occurred, and cancel the payment and perform refund processing and the like. For example, after permission of provision of the product to the vending machine 20 (i.e., after permission notification information is transmitted from management server 30 to vending machine 20), when the normal completion notification information is not received by the management server 30 until a predetermined period of time has elapsed, the management server 30 may determine that a timeout has occurred, and cancel the payment, and perform refund processing. In this case, notification information indicating that the provision of the product is not complete may be transmitted to the mobile terminal 10, and the notification information may be displayed on the display unit 16. With this configuration, when the user is unable to obtain the product, for example, when the permission notification information has failed to arrive at the vending machine 20 due to failure of the network 2 or when the product has failed to appear in the product dispensing port due to a problem with the vending machine 20, the payment is canceled, and a situation can be avoided in which a product is not obtained even though the user has paid for the product. In the first embodiment, when it is determined that a timeout has occurred, it is possible to perform payment again on the payment screen 40 by returning the status flag (see FIG. 8) of the product to be purchased from "1" to "0".

[4-9] In the third embodiment, an image of a sample window of the vending machine 20 photographed by the camera of the mobile terminal 10 may be displayed in place of the product selection screen 60, and the product to be purchased selected by the user may be identified by utilizing image recognition technology or the like.

[4-10] Guidance to the position of the vending machine 20 may be provided by using augmented reality technology (AR technology) or the like. For example, a camera function of the mobile terminal 10 may be enabled, and a real space image photographed by a lens may be displayed on the display unit 16. AR technology may be used to guide to the position of the vending machine 20 in the real space image. A mark (e.g., arrow) indicating the position of the vending machine 20 may be displayed in the real space image.

[4-11] In the first embodiment, the transmission and reception of the payment information is not required to be directly performed between the payment information transmission unit 202 and the payment information reception unit 301. The payment information transmitted by the payment information transmission unit 202 may be received and stored by a device other than the management server 30, and the payment information stored in the device may be transmitted to the management server 30, and received by the payment information reception unit 301. The same also applies to the transmission and reception of other information in the first to third embodiments.

REFERENCE SIGNS LIST

1 vending machine management system, 2 network, 3 base station, 10 mobile terminal, 11 control unit, 12 storage unit, 13 communication unit, 14 beacon reception unit, 15 operation unit, 16 display unit, 17 audio output unit, 18 position measurement unit, 20 vending machine, 21 control unit, 22 storage unit, 23 communication unit, 24 beacon transmission unit, 30 server, 31 control unit, 32 storage unit, 33 communication unit, 40 payment screen, 41 map, 42 payment button, 50 payment information input screen, 51 map, 52 form, 53 payment button, 60 product selection screen, 61 map, 62 payment button, 101 identification information acquisition unit, 102 identification information transmission unit, 103 payment information reception unit, 104 payment processing execution unit, 105 notification information transmission unit, 111 input screen display control unit, 112 proximity determination unit, 121 product/service information reception unit, 122 selection screen display control unit, 201 identification information provision unit, 202 payment information transmission unit, 203 product/service provision unit, 301 payment information reception unit, 302 payment information storage unit, 303 identification information reception unit, 304 payment information transmission unit, 305 notification information reception unit, 306 provision permission unit, 321 product/service information transmission unit

The invention claimed is:

1. A vending machine management system, comprising:
   a vending machine configured to provide a product or a service;
   a mobile terminal; and
   a management device, which is a device separate from the vending machine and the mobile terminal,
   wherein the mobile terminal comprising:
     at least one processor; and
     at least one memory device that stores a plurality of the mobile terminal instructions, which when executed by the at least one processor, cause the at least one processor of the mobile terminal to operate to:
   acquire identification information for identifying the vending machine; and
   execute payment processing for receiving provision of a product or a service from the vending machine,
   wherein the management device comprising:
     at least one processor; and
     at least one memory device that stores a plurality of the management device instructions, which when executed by the at least one processor, cause the at least one processor of the management device to operate to:
   receive the identification information;
   receive predetermined notification information, which is transmitted to the management device when the payment processing is complete; and
   send a permission without communicating through the mobile terminal, when the predetermined notification information is received, for the vending machine identified based on the identification information to provide the product or the service,
   wherein the vending machine comprises:
     a beacon transmitter transmitting a beacon indicating the identification information, wherein the mobile terminal instructions cause the at least one processor of the mobile terminal to operate to:
   receive the beacon, and
   acquire the identification information based on the beacon.

2. The vending machine management system according to claim 1,
   wherein the management device instructions cause the at least one processor of the management device to operate to permit, when the predetermined notification information is received and it is determined based on a predetermined determination criterion that the mobile terminal and the vending machine identified based on the identification information are in proximity to each other, the vending machine identified based on the identification information to provide the product or the service.

3. The vending machine management system according to claim 1,
   wherein the management device instructions cause the at least one processor of the management device to operate to permit, when the predetermined notification information is received and it is determined based on a predetermined determination criterion that the mobile terminal and the vending machine identified based on the identification information are in proximity to each other, the vending machine identified based on the identification information to provide the product or the service,
wherein the vending machine comprising:
at least one processor; and
at least one memory device that stores a plurality of the vending machine instructions, which when executed by the at least one processor, cause the at least one processor of the vending machine to operate to transmit a beacon indicating the identification information,
wherein the mobile terminal instructions cause the at least one processor of the mobile terminal to operate to:
receive the beacon, and
acquire the identification information based on the beacon, and
wherein the predetermined determination criterion includes a determination criterion for determining whether the mobile terminal and the vending machine identified based on the identification information are in proximity to each other based on whether a reception strength of the beacon at the mobile terminal is equal to or more than a threshold value.

4. The vending machine management system according to claim 1,
wherein the mobile terminal instructions cause the at least one processor of the mobile terminal to operate to:
acquire information on the product or the service to be provided by the vending machine; and
display, based on the information acquired by the product/service information acquisition means, on display means of the mobile terminal, a selection screen for selecting as a purchase target any one of the product and the service to be provided by the vending machine,
execute the payment processing for receiving provision of the one of the product and the service selected as the purchase target, and
wherein the management device instructions cause the at least one processor of the management device to operate to permit the vending machine identified based on the identification information to provide the one of the product and the service selected as the purchase target.

5. The vending machine management system according to claim 2,
wherein the management device instructions cause the at least one processor of the management device to operate to permit, when the predetermined notification information is received and it is determined based on a predetermined determination criterion that the mobile terminal and the vending machine identified based on the identification information are in proximity to each other, the vending machine identified based on the identification information to provide the product or the service,
wherein the vending machine comprising:
at least one processor; and
at least one memory device that stores a plurality of the vending machine instructions, which when executed by the at least one processor, cause the at least one processor of the vending machine to operate to:
transmit a beacon indicating the identification information,
transmit a beacon indicating the product or the service to be provided by the vending machine,
wherein the mobile terminal instructions cause the at least one processor of the mobile terminal to operate to:
receive the beacon,
acquire the identification information based on the beacon,
acquire, based on the beacon, information on the product or the service to be provided by the vending machine,
display, based on the information acquired by the product/service information acquisition means, on display means of the mobile terminal, a selection screen for selecting as a purchase target any one of the product and the service to be provided by the vending machine,
execute the payment processing for receiving provision of the one of the product and the service selected as the purchase target, and
wherein the predetermined determination criterion includes a determination criterion for determining whether the mobile terminal and the vending machine identified based on the identification information are in proximity to each other based on whether a reception strength of the beacon at the mobile terminal is equal to or more than a threshold value,
wherein the management device instructions cause the at least one processor of the management device to operate to permit the vending machine identified based on the identification information to provide the one of the product and the service selected as the purchase target.

6. The vending machine management system according to claim 4,
wherein the mobile terminal instructions cause the at least one processor of the mobile terminal to operate to transmit the identification information to the management device, to thereby acquire from the management device information on the product or the service to be provided by the vending machine identified based on the identification information.

7. The vending machine management system according to claim 1,
wherein the mobile terminal instructions cause the at least one processor of the mobile terminal to operate to display a screen indicating a position of the vending machine on display means of the mobile terminal.

8. The vending machine management system according to claim 1,
wherein the mobile terminal instructions cause the at least one processor of the mobile terminal to operate to display, when a product having no stock is included among products to be provided by the vending machine, a screen indicating another vending machine having stock of the product on display means of the mobile terminal.

9. The vending machine management system according to claim 1,
wherein the vending machine instructions cause the at least one processor of the vending machine to operate to:
provide the identification information to the mobile terminal,
wherein the mobile terminal instructions cause the at least one processor of the mobile terminal to operate to acquire the identification information provided by the identification information provision means, and
wherein the vending machine instructions cause the at least one processor of the vending machine to operate to be subsequently added to the vending machine.

10. A vending machine management method, comprising:
acquire, by a mobile terminal, identification information for identifying a vending machine;

execute, by the mobile terminal, payment processing for receiving provision of a product or a service from the vending machine;

receive the identification information by a management device, the management device being a device separate from the vending machine and the mobile terminal;

receive, by the management device, predetermined notification information, which is transmitted to the management device when the payment processing is complete; and send a permission without communicating through the mobile terminal, by the management device, when the predetermined notification information is received, for the vending machine identified based on the identification information to provide the product or the service;

wherein the vending machine comprises:

a beacon transmitter transmitting a beacon indicating the identification information, wherein the mobile terminal instructions cause the at least one processor of the mobile terminal to operate to:

receive the beacon, and acquire the identification information based on the beacon.

11. A non-transitory computer readable storage medium storing a plurality of server instructions, wherein when executed by at least one processor, the plurality of the server instructions cause the at least one processor of the server to:

acquire identification information for identifying a vending machine;

execute payment processing for receiving provision of a product or a service from the vending machine; and transmit predetermined notification information to a management device when the payment processing is complete, the management device, which has received the predetermined notification information, being configured to send a permission without communicating through the mobile terminal to the vending machine identified based on the identification information to provide the product or the service;

wherein the vending machine comprises:

a beacon transmitter transmitting a beacon indicating the identification information, wherein the mobile terminal instructions cause the at least one processor of the mobile terminal to operate to:

receive the beacon, and acquire the identification information based on the beacon.

* * * * *